United States Patent
Kang et al.

(10) Patent No.: US 6,731,481 B2
(45) Date of Patent: May 4, 2004

(54) RELAYING METHOD FOR PROTECTING TRANSFORMERS

(75) Inventors: Yong Cheol Kang, Jeollabuk-do (KR); Sang Hee Kang, #326-205, Jugong Apartment, Banpo 1-dong, Seocho-gu, Seoul (KR); Byung Eun Lee, Jeollabuk-do (KR); Jae Sung Yun, Jeollabuk-do (KR); Seung Hun Ok, Jeollabuk-do (KR)

(73) Assignees: Xelpower Co., Ltd., Seoul (KR); Yong-Cheol Kang, Jeollabuk-do (KR); Sang Hee Kang, Seoul (KR)

( * ) Notice: Subject to any disclaimer, the term of this patent is extended or adjusted under 35 U.S.C. 154(b) by 182 days.

(21) Appl. No.: 10/001,599

(22) Filed: Oct. 23, 2001

(65) Prior Publication Data

US 2003/0036821 A1 Feb. 20, 2003

(30) Foreign Application Priority Data

Apr. 27, 2001 (JP) .................... 2001-170278

(51) Int. Cl.$^7$ ................................. H02H 7/04
(52) U.S. Cl. ........................... 361/38; 361/38
(58) Field of Search ............... 361/38, 36, 63, 361/76, 79, 94, 93.6

(56) References Cited

U.S. PATENT DOCUMENTS

| | | | | |
|---|---|---|---|---|
| 3,832,600 A | * | 8/1974 | Specht | 361/36 |
| 4,689,710 A | * | 8/1987 | Anzai | 361/87 |
| 4,772,978 A | * | 9/1988 | Oura et al. | 361/36 |
| 5,170,308 A | * | 12/1992 | Inagaki et al. | 361/36 |
| 5,627,712 A | * | 5/1997 | Wilkinson | 361/63 |

* cited by examiner

Primary Examiner—Gregory J. Toatley, Jr.
Assistant Examiner—Danny Nguyen
(74) Attorney, Agent, or Firm—Harness, Dickey & Pierce, P.L.C.

(57) ABSTRACT

The present invention relates to a relaying method using the ratio of induced voltages or the ratio of flux linkage increments. The protective relaying method for power transformers with one or more phases includes the first step of obtaining primary and secondary voltages and currents of the transformer; the second step of calculating induced voltages, induced voltage differences, ratio of primary and secondary induced voltages, or ratio of primary and secondary induced voltage differences from the currents and the voltages; the third step of calculating at least one predetermined decision parameter derived from at least one predetermined equation; the fourth step of deciding whether an internal winding fault occurs by comparing the decision parameter to the induced voltages, the induced voltage differences, the ratio of primary and secondary induced voltages, or the ratio of primary and secondary induced voltage differences.

20 Claims, 18 Drawing Sheets

(a)

(b)

(c)

11A
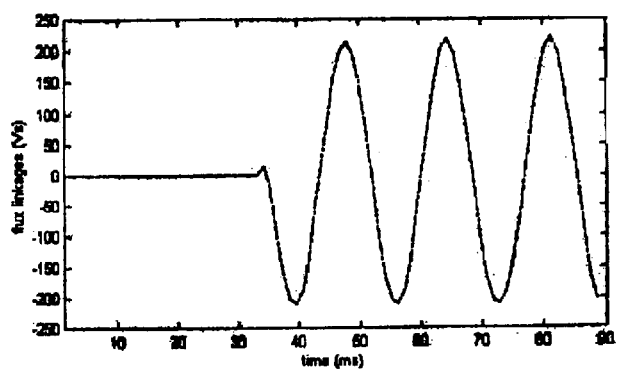
FIG. 11B
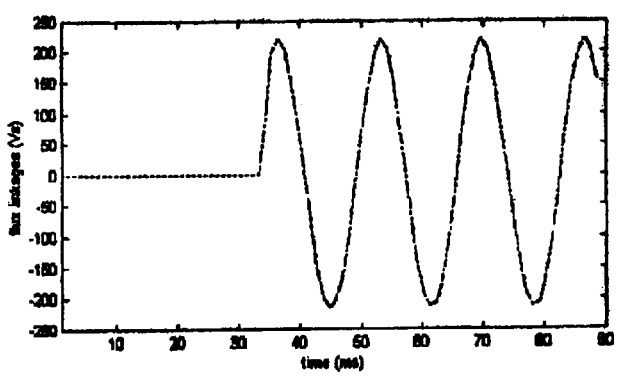
FIG. 11C
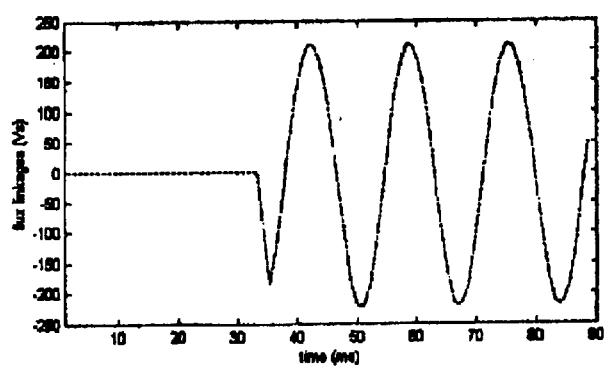

RELAYING METHOD FOR PROTECTING TRANSFORMERS

BACKGROUND OF THE INVENTION

1. Field of the Invention

The present invention relates to a relaying method for transformer protection. More specifically, the present invention relates to a relaying method using the ratio of induced voltages or the ratio of flux linkage increments.

2. Description of the Related Art

Current differential relays with harmonic constraints are widely used for power transformers. These relays determines a fault if a differential current between the primary and secondary windings is larger than a threshold value. The relays may malfunction in case of magnetic inrush or overexcitation. In order to prevent malfunction they use the second harmonic, third harmonic, or the total harmonic component of the current.

However, because of increase of operating voltages and length of transmission line, the differential currents during internal transformer faults can contain large harmonic components. Therefore, the security of the differential relays using harmonic restraints is a matter of concern. Also, these relays are inherently insensitive to turn-to-turn faults.

Recently, some algorithms use electromagnetic equations of transformers.

One of them is based on an equivalent circuit composed of inverse inductance. Another one is a flux-restrained current-differential relay. Both of them use winding currents those are practically unavailable in some situations such as a three-phase wye-delta transformer. Some elements used in the first method are nonlinear depending on the operating condition and thus it is very difficult to determine their values. In case of the second method, the winding resistance is neglected. But, practically it cannot be neglected. Thus, if there exits a winding resistance, large errors are contained.

SUMMARY OF THE INVENTION

Thus, the invention intends to overcome the above-mentioned problems and the purpose of the invention is to provide a protective relaying method for power transformers. In other words, the ratio of primary and secondary flux linkage increments is the same as the turn ratio in case of magnetic inrush and overexcitation, while the ratio is different from the turn ratio in case of internal winding faults. Thus, this invention provides a protective relaying method for power transformers; the method calculates the ratio of primary and secondary flux linkage increments from the primary and secondary voltages and currents and then compares the ratio with the turn ratio to discriminate magnetic inrush and internal winding faults.

And, another purpose of the invention is to provide a protective relaying method for power transformers using the ratio of primary and secondary induced voltages. In other words, the ratio of induced voltages is the same as the turn ratio in case of magnetic inrush and overexcitation, while the ratio is different from the turn ratio in case of internal winding faults. Thus, this invention provides a protective relaying method for power transformers; the method calculates the ratio of primary and secondary induced voltages from the primary and secondary voltages and currents and then compares the ratio with the turn ratio to discriminate magnetic inrush and internal winding faults.

According to a feature of the present invention to achieve the above object, the protective relaying method for power transformers with one or more phases includes the first step of obtaining primary and secondary voltages and currents of said transformer; the second step of calculating induced voltages, induced voltage differences, ratio of primary and secondary induced voltages, or ratio of primary and secondary induced voltage differences from said currents and said voltages; the third step of calculating at least one predetermined decision parameter derived from at least one predetermined equation; the fourth step of deciding whether an internal winding fault occurs by comparing said decision parameter to said induced voltages, said induced voltage differences, said ratio of primary and secondary induced voltages, or said ratio of primary and secondary induced voltage differences.

According to another feature of the present invention to achieve the above object, the protective relaying method for power transformers with one or more phases includes the first step of obtaining primary and secondary voltages and currents of said transformer; the second step of calculating flux linkage increments, flux linkage difference increments, the ratio of primary and secondary flux linkage increments, or ratio of primary and secondary flux linkage difference increments from said currents and said voltages; the third step of calculating at least one predetermined decision parameter derived from at least one predetermined equation; and the fourth step of deciding whether an internal winding fault occurs by comparing said decision parameter to said flux linkage increments, said flux linkage difference increments, said the ratio of primary and secondary flux linkage increments, or said ratio of primary and secondary flux linkage difference increments.

BRIEF DESCRIPTION OF THE DRAWINGS

FIG. 11A to FIG. 11C show the drawing of calculated flux linkage difference increments of Detector 1 among three Detectors according to preferred embodiment 2.

DETAILED DESCRIPTION OF THE PREFERRED EMBODIMENTS

Preferred embodiments of the present invention will now be described in detail with reference to the accompanying drawings.

Figure 1:
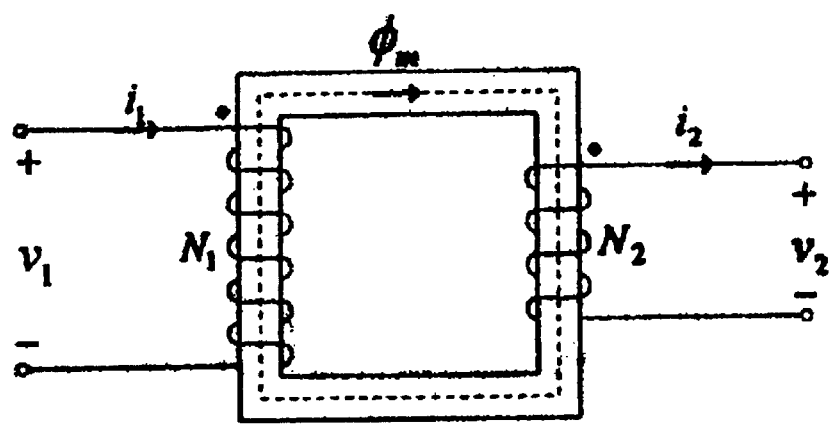
FIG. 1 shows the drawing of a two winding single-phase transformer.

The first preferred embodiment of the invention relates to a protective relaying algorithm for power transformers using the ratio of primary and secondary induced voltages. FIG. 1 shows a two winding single-phase transformer. If there is no internal fault of the two-winding single-phase transformer, the primary and secondary voltages at any instant can be given by the following Equation 1 and Equation 2.

$$v_1 = R_1 i_1 + L_{l1}\frac{di_1}{dt} + e_1 \qquad \text{[Equation 1]}$$

$$v_2 = -R_2 i_2 - L_{l2}\frac{di_2}{dt} + e_2 \qquad \text{[Equation 2]}$$

where, $R_1$, $R_2$ are the primary and secondary winding resistances, respectively, and $L_{l1}$, $L_{l2}$ are the primary and secondary leakage inductances, respectively, and $e_1$, $e_2$ are primary, secondary induced voltages, respectively.

Rearranging Equation 1 and Equation 2 yields Equation 3 and Equation 4.

$$e_1 = v_1 - R_1 i_1 - L_{l1}\frac{di_1}{dt} \qquad \text{[Equation 3]}$$

$$e_2 = v_2 + R_2 i_2 + L_{l2}\frac{di_2}{dt} \qquad \text{[Equation 4]}$$

Thus, induced voltages $e_1$, $e_2$ can be estimated with voltages, currents, winding resistances and leakage inductances. The ratio of induced voltages (RIV) is defined by Equation 5.

$$RIV = \frac{e_1}{e_2} = \frac{N_1}{N_2} \qquad \text{[Equation 5]}$$

As $e_1$, $e_2$ can be estimated using Equation 3 and Equation 4 the RIV can be calculated at any instant using Equation 5. In the steady state, if there is no internal winding fault, the RIV at any instant is equal to the turn ratio, i.e. $N_1/N_2$ except for $e_1=0$ or $e_2=0$.

In case of magnetic inrush, as the core repeats saturation and unsaturation, a magnetizing current also repeats large and small. This phenomenon lasts for some time. However, in this case since it is not an internal winding fault, the RIV is also equal to the turn ratio even when $e_1$, $e_2$ are not sinusoidal and distorted.

On the other hand, the RIV is not the same as the turn ratio in case of internal winding faults. Thus, from this point, the first preferred embodiment of this invention detects an internal fault of a transformer based on the following fact; it is not an internal fault if the RIV is the same as the turn ratio, while it is an internal fault otherwise.

However, $e_1$ and $e_2$ are instantaneous values and the RIV can grow up to a large value when $e_2$ has values near zero. In the first preferred embodiment of this invention, a Detector of Equation 6 is used to detect a fault instead of Equation 5. That is, if Equation 6 is less than the threshold, it is normal; otherwise, it is an internal winding fault.

$$\text{Detector} = \frac{e_1 - \frac{N_1}{N_2}e_2}{V_{1rms}} \times 100 \ (\%) \qquad \text{[Equation 6]}$$

where, $V_{1rms}$ is the primary rated voltage.

Figure 2:
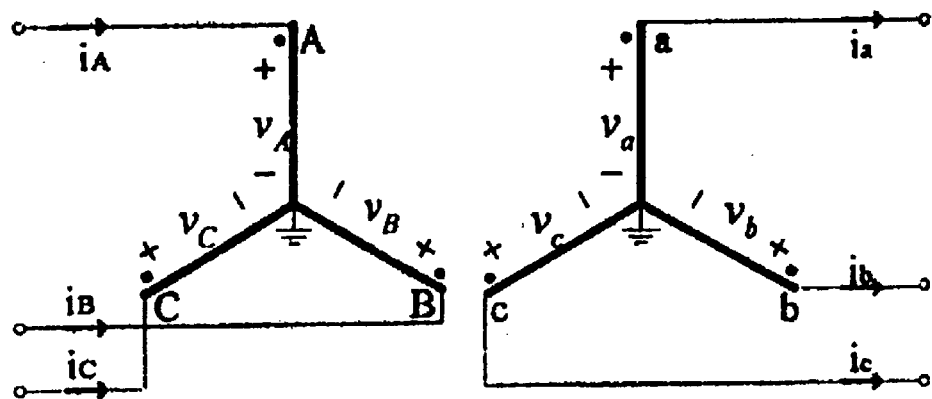
FIG. 2 shows the drawing of a two winding three-phase Y—Y transformer.

FIG. 2 shows the drawing of a two winding three-phase Y—Y transformer. In FIG. 2, $v_A$, $v_B$, $v_C$ represent primary voltages and $v_a$, $v_b$, $v_c$ means secondary voltages and $i_A$, $i_B$, $i_C$ are primary currents and $i_a$, $i_b$, $i_c$ are secondary currents.

In FIG. 2, voltages of the primary windings can be represented as Equation 7, Equation 8, and Equation 9.

$$v_A = R_A i_A + L_{lA}\frac{di_A}{dt} + e_A \qquad \text{[Equation 7]}$$

$$v_B = R_B i_B + L_{lB}\frac{di_B}{dt} + e_B \qquad \text{[Equation 8]}$$

$$v_C = R_C i_C + L_{lC}\frac{di_C}{dt} + e_C \qquad \text{[Equation 9]}$$

where, $R_A$, $R_B$, $R_C$ mean primary winding resistances and $L_{lA}$, $L_{lB}$, $L_{lC}$ mean primary leakage inductances, and $e_A$, $e_B$, $e_C$ mean primary induced voltages.

And, the voltages of the secondary windings are given by Equation 10, Equation 11, and Equation 12.

$$v_a = -R_a i_a - L_{la}\frac{di_a}{dt} + e_a \qquad \text{[Equation 10]}$$

$$v_b = -R_b i_b - L_{lb}\frac{di_b}{dt} + e_b \qquad \text{[Equation 11]}$$

$$v_c = -R_c i_c - L_{lc}\frac{di_c}{dt} + e_c \qquad \text{[Equation 12]}$$

where, $R_a$, $R_b$, $R_c$ are secondary winding resistances, and $L_{la}$, $L_{lb}$, $L_{lc}$ are secondary leakage inductances, and $e_a$, $e_b$, $e_c$ are secondary induced voltages.

In case of a three-phase Y—Y transformer, all the induced voltages of the primary and secondary windings can be calculated directly from Equation 7 to Equation 12. Thus, in exactly the same manner of a single-phase transformer, three Detectors are defined by Equation 13, Equation 14, and Equation 15.

$$\text{Detector } A = \frac{e_A - \frac{N_1}{N_2}e_a}{V_{Arms}} \times 100 \ (\%) \qquad \text{[Equation 13]}$$

$$\text{Detector } B = \frac{e_B - \frac{N_1}{N_2} e_b}{V_{Brms}} \times 100 \ (\%) \quad \text{[Equation 14]}$$

$$\text{Detector } C = \frac{e_C - \frac{N_1}{N_2} e_c}{V_{Crms}} \times 100 \ (\%) \quad \text{[Equation 15]}$$

If values of Detector A, Detector B, and Detector C are larger than the threshold, it is determined that an internal fault occurred on phase A, phase B and phase C, respectively.

The next topic is about a two-winding three-phase Y-Δ transformers.

Figure 3:
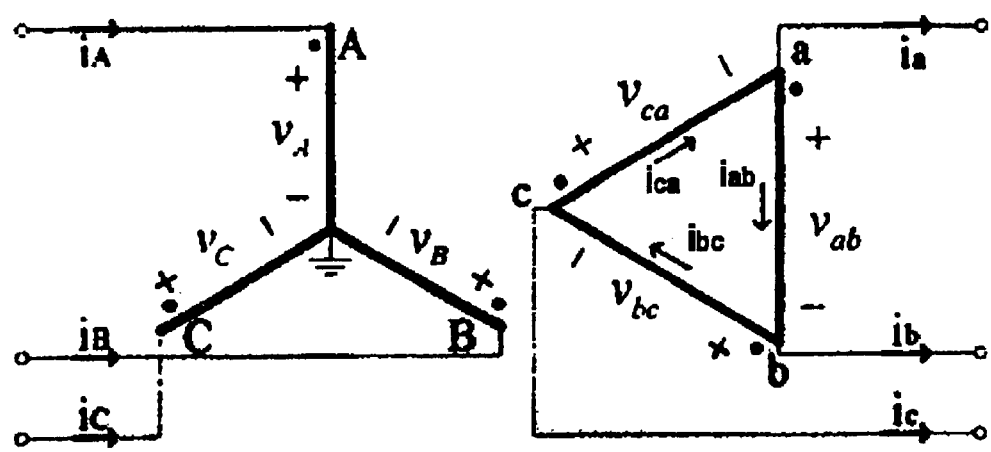
FIG. 3 shows the drawing of a two winding three-phase Y-Δ transformer.

FIG. 3 shows the connections of the primary and secondary windings of a three-phase Y-Δ transformer. In FIG. 3, $v_{ab}$, $V_{bc}$, $v_{ca}$ are secondary voltages and $i_{ab}$, $i_{bc}$, $i_{ca}$ are secondary currents, and $i_a$, $i_b$, $i_c$ are line currents.

In FIG. 3, voltages of the wye connected windings are represented in Equation 7, Equation 8 and Equation 9. Equation 16, Equation 17 and Equation 18 represent voltages of delta connected windings.

$$v_{ab} = R_{ab} i_{ab} + L_{lab} \frac{di_{ab}}{dt} + e_{ab} \quad \text{[Equation 16]}$$

$$v_{bc} = R_{bc} i_{bc} + L_{lbc} \frac{di_{bc}}{dt} + e_{bc} \quad \text{[Equation 17]}$$

$$v_{ca} = R_{ca} i_{ca} + L_{lca} \frac{di_{ca}}{dt} + e_{ca} \quad \text{[Equation 18]}$$

where, $R_{ab}$, $R_{bc}$, $R_{ca}$ are secondary winding resistances, and $L_{lab}$, $L_{lbc}$, $L_{lca}$ are secondary leakage inductances, and $e_{ab}$, $e_{bc}$, $e_{ca}$ are secondary induced voltages.

As $i_{ab}$, $i_{bc}$, $i_{ca}$ are not available in case of Y-Δ connection, $e_{ab}$, $e_{bc}$, $e_{ca}$ cannot be calculated directly from Equation 16, Equation 17 and Equation 18. However, $i_a$, $i_b$, $i_c$ are available. Thus, in this invention, in order to use $i_a$, $i_b$, $i_c$ the following relations $i_{ca} - i_{ab} = i_a$, $i_{ab} - i_{bc} = i_b$, $i_{bc} - i_{ca} = i_c$ are employed. Moreover, if there is no internal fault, $R_{ab} \approx R_{bc} \approx R_{ca} = R$ and $L_{lab} \approx L_{lbc} \approx L_{lca} = L_l$. Therefore, manipulating Equation 16, Equation 17 and Equation 18 gives the following Equation 19, Equation 20 and Equation 21.

$$e_{ca} - e_{ab} = v_{ca} - v_{ab} - R i_a - L_l \frac{di_a}{dt} \quad \text{[Equation 19]}$$

$$e_{ab} - e_{bc} = v_{ab} - v_{bc} - R i_b - L_l \frac{di_b}{dt} \quad \text{[Equation 20]}$$

$$e_{bc} - e_{ca} = v_{bc} - v_{ca} - R i_c - L_l \frac{di_c}{dt} \quad \text{[Equation 21]}$$

Therefore, while $e_{ab}$, $e_{bc}$, $e_{ca}$ cannot be calculated, left-hand sides of Equation 19, Equation 20 and Equation 21 can be calculated. The following Equation 22, Equation 23, and Equation 24 for the primary winding corresponding to Equation 19, Equation 20 and Equation 21 can be derived by manipulating Equation 7, Equation 8 and Equation 9.

$$e_C - e_A = v_C - v_A - (R_C i_C - R_A i_A) - \left( L_{lC} \frac{di_C}{dt} - L_{lA} \frac{di_A}{dt} \right) \quad \text{[Equation 22]}$$

$$e_A - e_B = v_A - v_B - (R_A i_A - R_B i_B) - \left( L_{lA} \frac{di_A}{dt} - L_{lB} \frac{di_B}{dt} \right) \quad \text{[Equation 23]}$$

$$e_B - e_C = v_B - v_C - (R_B i_B - R_C i_C) - \left( L_{lB} \frac{di_B}{dt} - L_{lC} \frac{di_C}{dt} \right) \quad \text{[Equation 24]}$$

If there is no internal fault in case of a Y-Δ transformer, the following relationships in Equation 25 are valid.

$$\frac{e_A}{e_{ab}} = \frac{N_1}{N_2}, \frac{e_B}{e_{bc}} = \frac{N_1}{N_2}, \frac{e_C}{e_{ca}} = \frac{N_1}{N_2} \quad \text{[Equation 25]}$$

While $e_A$, $e_B$, $e_C$ can be calculated, $e_{ab}$, $e_{bc}$, $e_{ca}$ cannot. Thus, Equation 25 cannot be applied directly to Detectors like a Y—Y transformer. Equation 26 is used for fault detection in case of a Y-Δ transformer.

$$\frac{e_C - e_A}{e_{ca} - e_{ab}} = \frac{N_1}{N_2}, \frac{e_A - e_B}{e_{ab} - e_{bc}} = \frac{N_1}{N_2}, \frac{e_B - e_C}{e_{bc} - e_{ca}} = \frac{N_1}{N_2} \quad \text{[Equation 26]}$$

Equation 25 is a necessary and sufficient condition of Equation 26. Sufficient condition is proved trivially in substituting Equation 25 into Equation 26. Thus, only necessary conditions will be proved. Let three RIVs as $$\text{Detector } 1 = \frac{e_C - e_A - \frac{N_1}{N_2}(e_{ca} - e_{ab})}{V_{CArms}} \times 100 \ (\%) \quad \text{[Equation 27]}$$

$$\text{Detector } 2 = \frac{e_A - e_B - \frac{N_1}{N_2}(e_{ab} - e_{bc})}{V_{ABrms}} \times 100 \ (\%) \quad \text{[Equation 28]}$$

$$\text{Detector } 3 = \frac{e_B - e_C - \frac{N_1}{N_2}(e_{bc} - e_{ca})}{V_{BCrms}} \times 100 \ (\%) \quad \text{[Equation 29]}$$

and $$\frac{e_A}{e_{ab}} = \alpha, \frac{e_B}{e_{bc}} = \beta$$

Substituting the three RIVs into Equation 26 yields the following three equations $$\frac{e_C}{e_{ca}} = \gamma.$$

and $$\gamma e_{ca} - \alpha e_{ab} = \frac{N_1}{N_2}(e_{ca} - e_{ab}), \ \alpha e_{ab} - \beta e_{bc} = \frac{N_1}{N_2}(e_{ab} - e_{bc})$$

In order for the former three Equations to be valid for all $e_{ab}$, $e_{bc}$, $e_{ca}$, the condition of $\alpha = \beta = \gamma = N_1/N_2$ should be satisfied. Thus, $$\beta e_{bc} - \gamma e_{ca} = \frac{N_1}{N_2}(e_{bc} - e_{ca}).$$

Therefore, Equation 25 is a necessary and sufficient condition of Equation 26.

Thus, in the first preferred embodiment of the invention, the Detectors for a Y-Δ transformer are given by Equation 27, Equation 28, and Equation 29.

$$\frac{e_A}{e_{ab}} = \frac{e_B}{e_{bc}} = \frac{e_C}{e_{ca}} = \frac{N_1}{N_2}.$$

Table 1 shows the rule of detecting internal faults and the faulted phase from the Detectors of Equation 27, Equation 28, and Equation 29 in case of a Y-Δ transformer.

TABLE 1

| Detector 1 | Detector 2 | Detector 3 | Fault detection |
| --- | --- | --- | --- |
| < Th. | < Th. | < Th. | No internal fault |
|  |  |  | Internal winding fault |
| ≥ Th. | ≥ Th. | < Th. | A phase |
| < Th. | ≥ Th. | ≥ Th. | B phase |
| ≥ Th. | < Th. | ≥ Th. | C phase |
| ≥ Th. | ≥ Th. | ≥ Th. | Internal winding fault |

If all the three Detectors are less than threshold (Th.), it is not an internal fault. If one Detector is less than threshold and the other two Detectors are not, the faulted phase can be identified as shown in Table 1. If two or more phases are faulted, fault detection is possible. However, the faulted phase cannot be identified.

Case studies of the first preferred embodiment of a protective relaying method are now provided.

Figure 4:
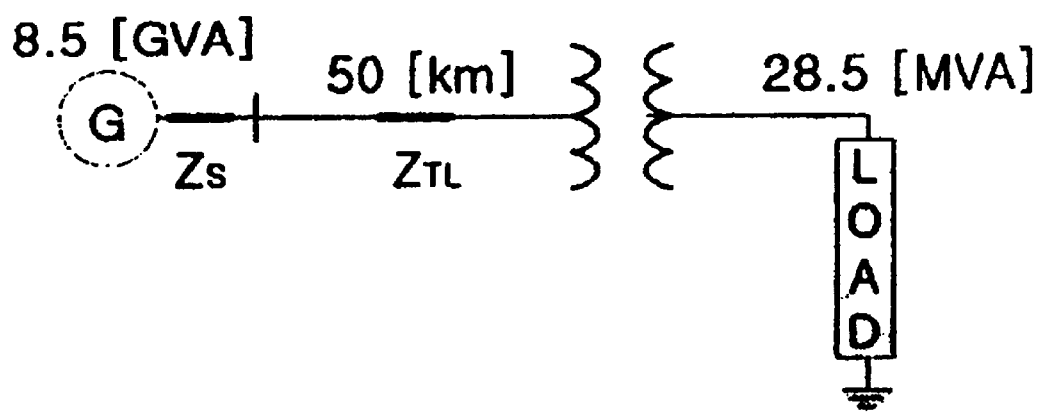
FIG. 4 shows the drawing of the model system including a two winding three-phase Y-Δ transformer in which the protective relaying method of this invention is applied.

FIG. 4 shows the model system studied in this invention. A two winding three-phase Y-Δ transformer (154 kV/14.7 kV, 100 (MVA)) is used to generate fault data and inrush data using EMTP. An internal winding fault modeling method is used to model the turn-to-ground and turn-to-turn winding faults. The sampling rate of 16 sample/cycle is employed.

First case is magnetic inrush.

We will explain the two magnetic inrush cases of with 0(%) and +80(%) remanent fluxes of the saturation point in case of 0 (deg) energization angle and no load.

Figure 5:
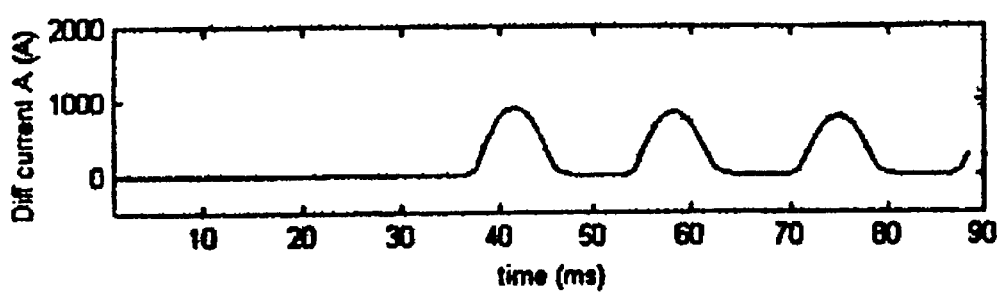
FIG. 5 shows the drawing of currents of each phase in case of no remanent flux in the transformer.
Figure 5:
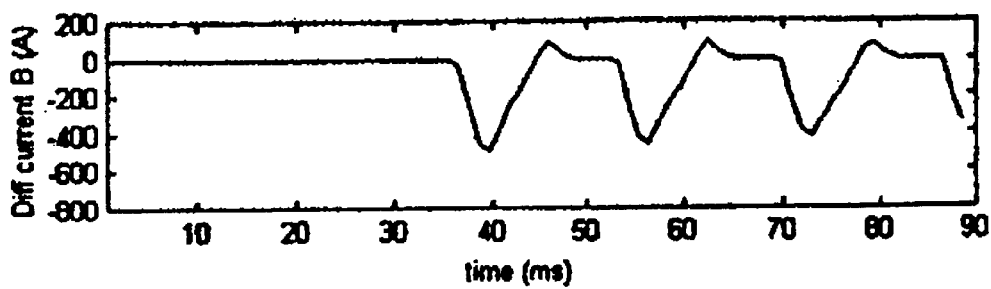
Figure 5:
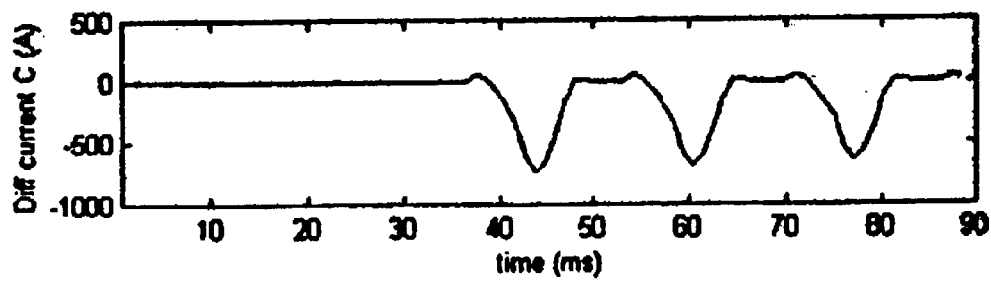

FIG. 5 shows three-phase currents in case of magnetic inrush with a 0(%) remanent flux, 0 (deg) energization angle, and no load.

Figure 6:
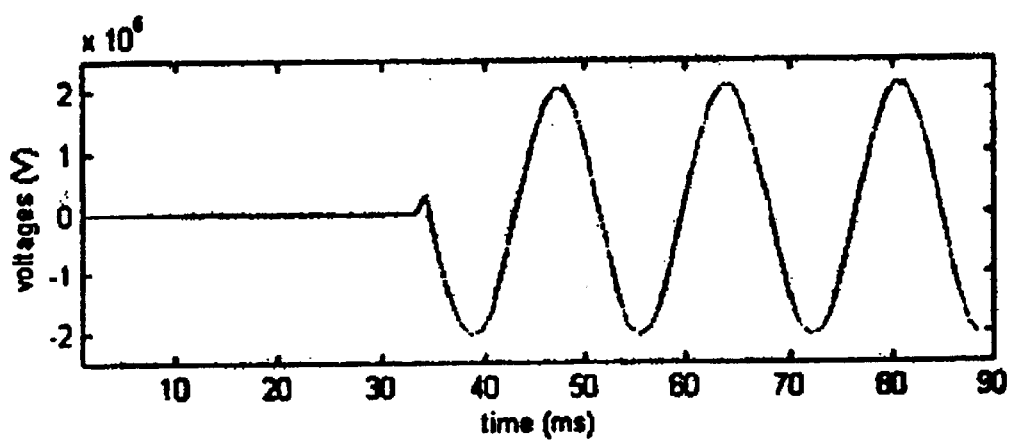
FIG. 6 shows the drawing of calculated induced voltages' differences of Detector 1 among three Detectors.
Figure 7A:
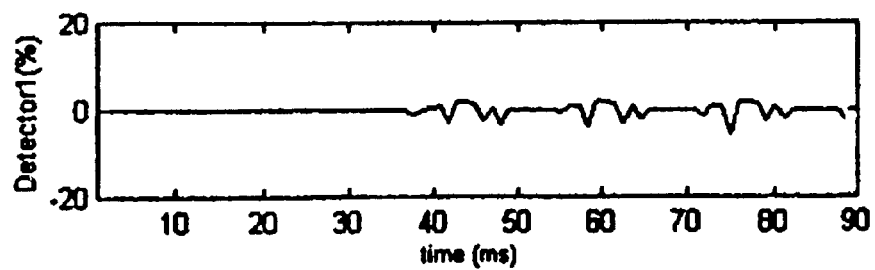
FIG. 7A to FIG. 7D show the drawings of three Detectors and a trip signal in case of no remanent flux according to the first preferred embodiment of this invention.
Figure 7B:
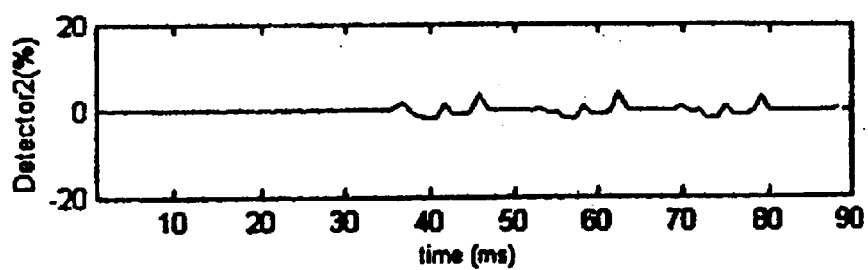
Figure 7C:
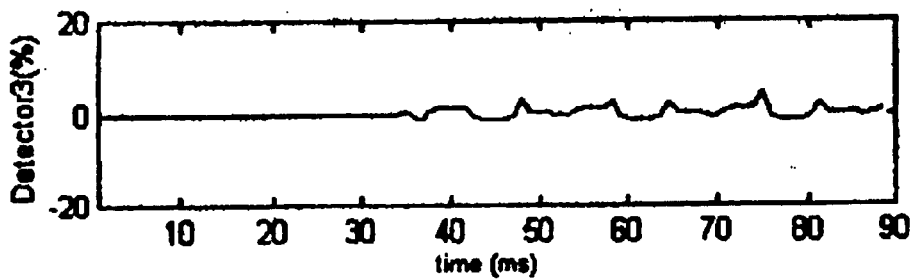
Figure 7D:
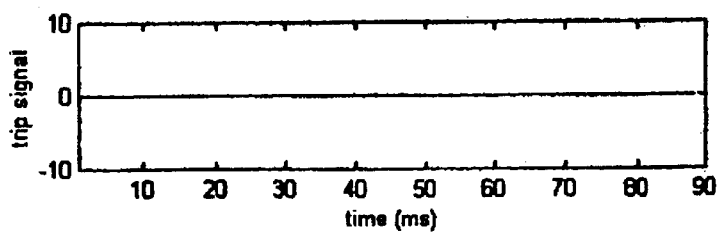

FIG. 6 shows calculated induced voltages' differences of Detector 1 i.e. $e_C - e_A$ and $N_1/N_2(e_{ca} - e_{ab})$ among three Detectors. The result indicates that the two calculated induced voltage differences are nearly the same even if inrush currents contain harmonic components.

FIG. 7A to FIG. 7D show the drawings of three Detectors and a trip signal in case of no remanent flux according to preferred embodiment 1 of this invention. Trip signal in FIG. 7, means the signal to initiate the circuit breaker after detection of a fault.

In this preferred embodiment, if a Detector is greater than 5(%) a counter is increased by one and otherwise decreased by one. In addition to that, if the counter is less than zero, it is reset to zero. If a counter exceeds four i.e. ¼ cycle, the final trip is issued. As the three Detectors are less than 5(%) the trip signal is blocked even the A-phase inrush current increases up to nearly 900 (A) after the energization.

The errors shown in Detectors of FIG. 7 are caused from approximation of differentiation terms in Equation 19 to Equation 24. In this preferred embodiment, the sampling rate of 16 (c/s) is used. However, these errors can be decreased if a higher sampling rate is used.

Figure 8A:
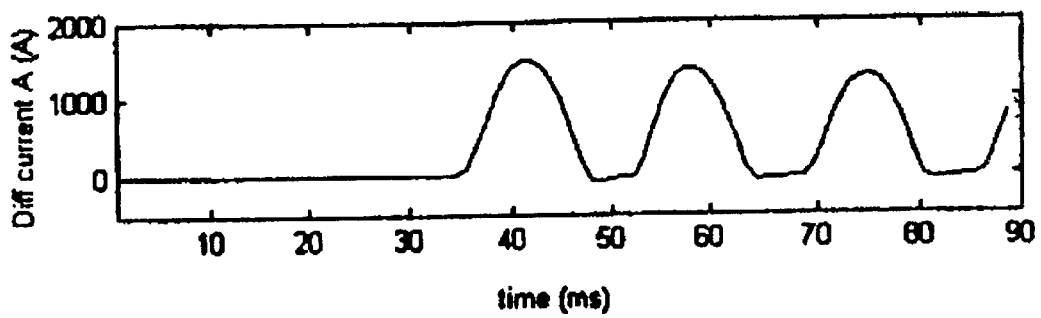
FIG. 8A to FIG. 8C show the drawings of currents of each phase in case of +80% remanent flux of the saturation point in the transformer.
Figure 8B:
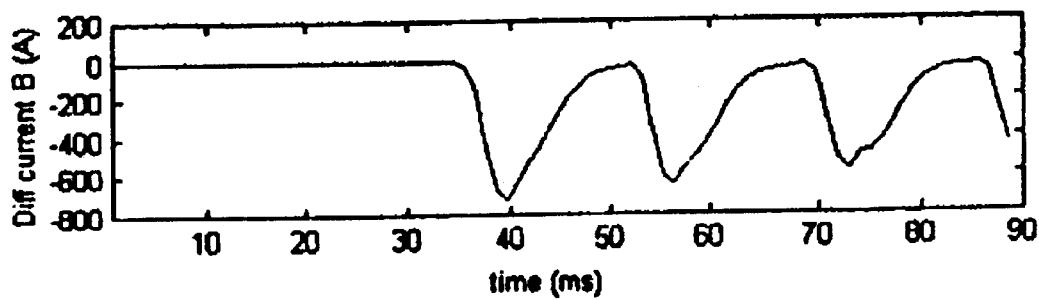
Figure 8C:
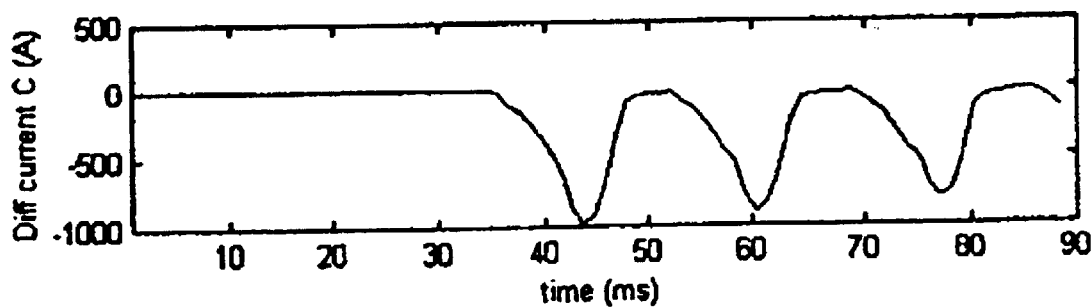
Figure 9A:
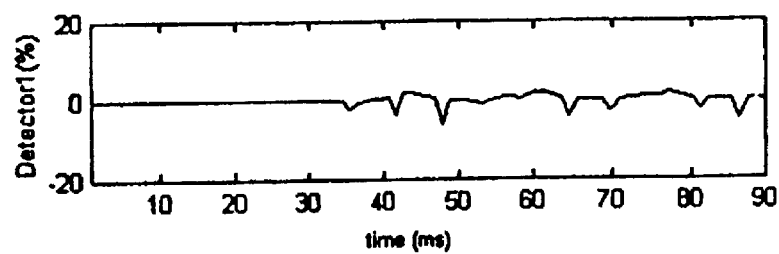
FIG. 9A to FIG. 9D show the drawings of three Detectors and a trip signal in case of +80% remanent flux according to the first preferred embodiment of this invention.
Figure 9B:
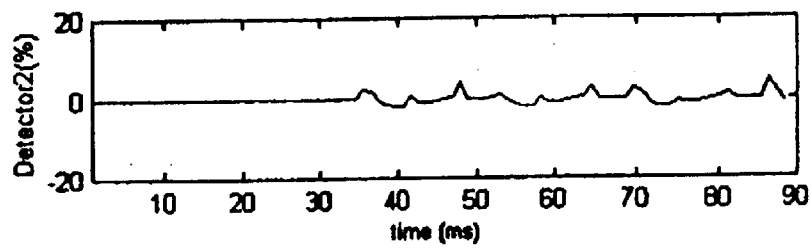
Figure 9C:
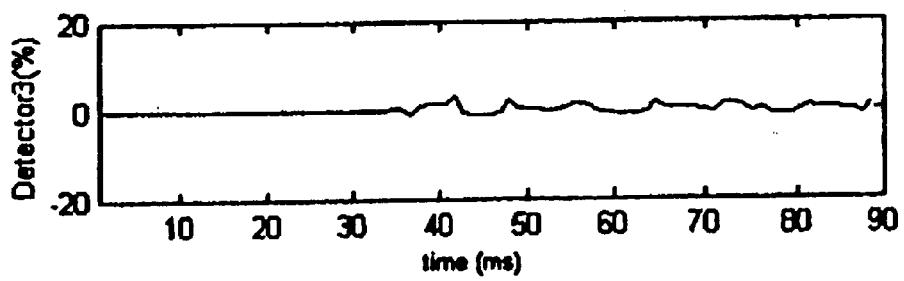
Figure 9D:
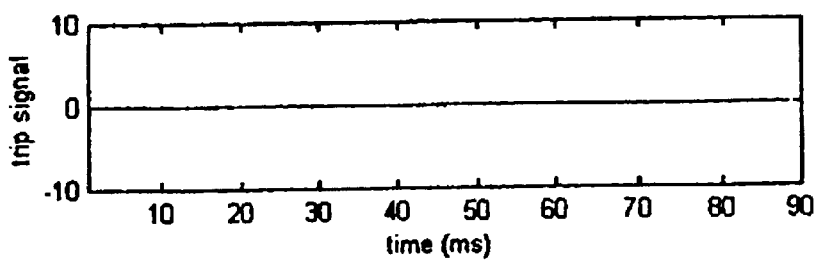
Figure 10A:
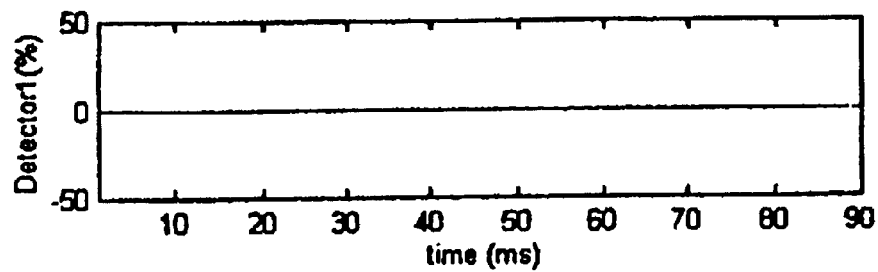
FIG. 10A to FIG. 10D show the drawings of three Detectors and a trip signal in case of the B-phase internal turn-to-earth fault at the 40% point from the neutral according to the first preferred embodiment of this invention.
Figure 10B:
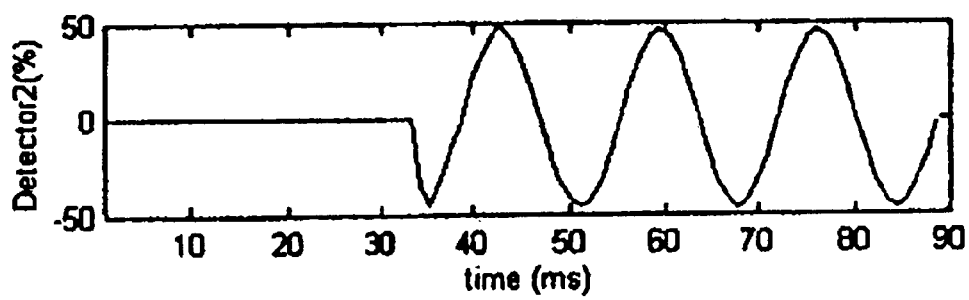
Figure 10C:
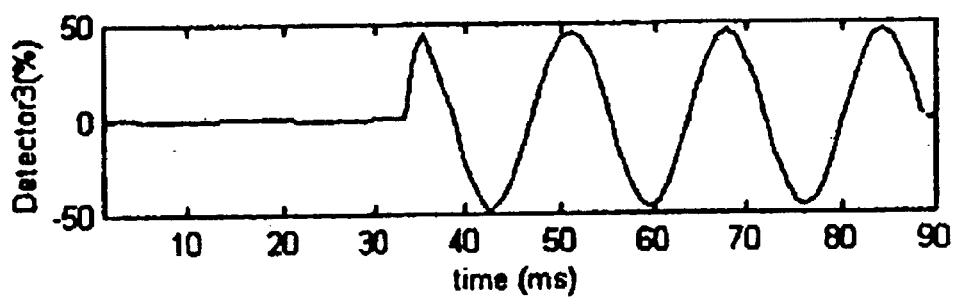
Figure 10D:
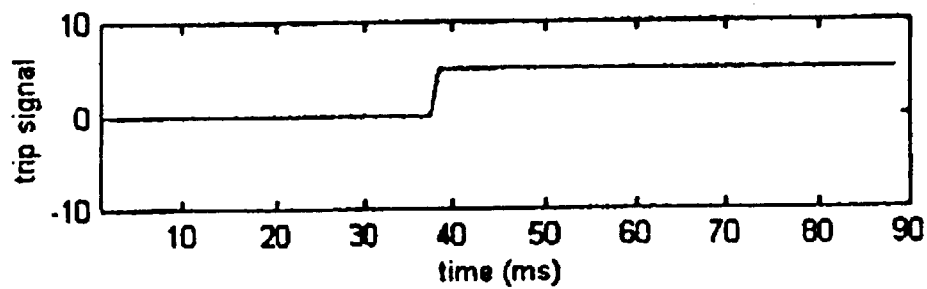
Figure 12A:
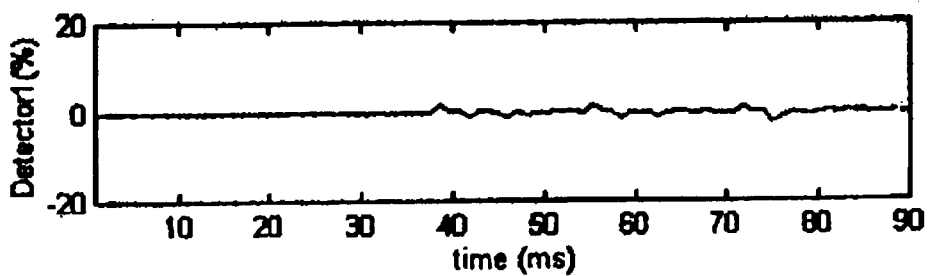
FIG. 12A to FIG. 12D show the drawings of three Detectors and a trip signal in case of no remanent flux according to the second preferred embodiment of this invention.
Figure 12B:
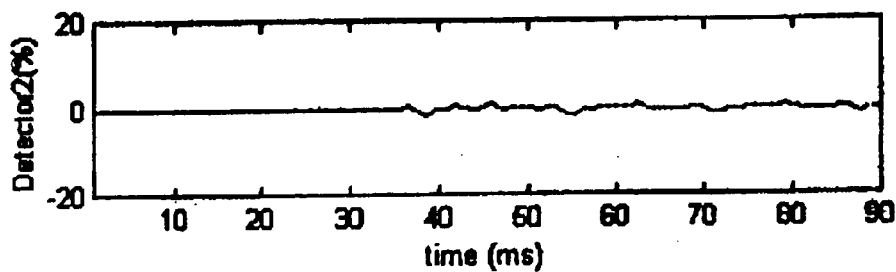
Figure 12C:
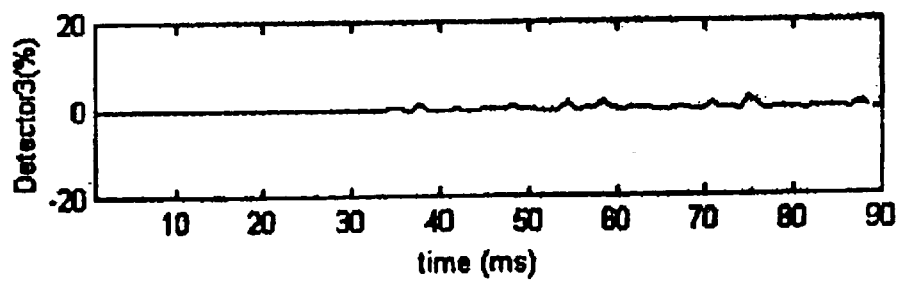
Figure 12D:
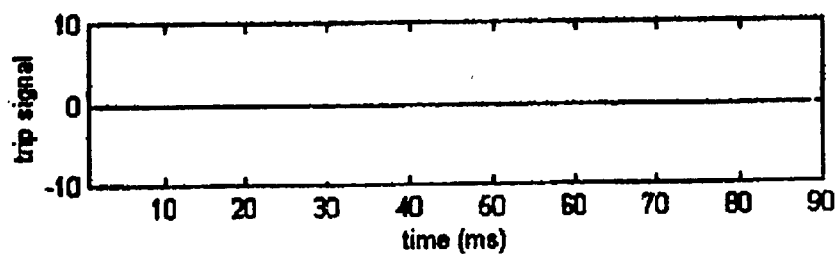

FIG. 8 and FIG. 9 show currents of each phase, the three Detectors, and a trip signal in case of +80% remanent flux of the saturation point in the transformer. As expected, due to the maximum flux, large inrush current (nearly 1600 (A)) is drawn. However, as shown in FIG. 9, all the three Detectors are less than 5(%) even when very large inrush currents and the trip signal is blocked.

An internal winding fault is now explained.

FIG. 10 shows the three Detectors and a trip signal in case of the B-phase internal turn-to-earth fault at the 40% point from the neutral according to preferred embodiment 1 of this invention. As expected, in case of an internal winding fault, the ratio of induced voltage differences is not the same as the turn ratio. As shown in FIG. 10, the proposed method detects the internal winding fault 4.167 (ms) after a fault.

Finally, preferred embodiment 1 proposes a transformer protective relaying algorithm using the ratio of induced voltages. The proposed algorithm calculates the induced voltages of the primary and secondary windings from the currents and voltages and then clearly discriminates between internal winding faults and magnetic inrush with the ratio. Various test results clearly demonstrate that the algorithm does not malfunction even in case of inrush with the maximum remanent flux. Moreover, it detects internal winding faults in only ¼ cycle after a fault.

Although the invention is described herein with reference to the preferred embodiment, it should be clearly understood that many variations and/or modifications of the basic inventive concepts herein taught which may be apparent to those skilled in the present art will remain within the spirit and scope of the present invention, as defined in the appended claims.

The cases of three-phase Δ-Y transformer and Δ-Δ transformer are briefly described below as examples of the above mentioned modifications.

Figure 17:
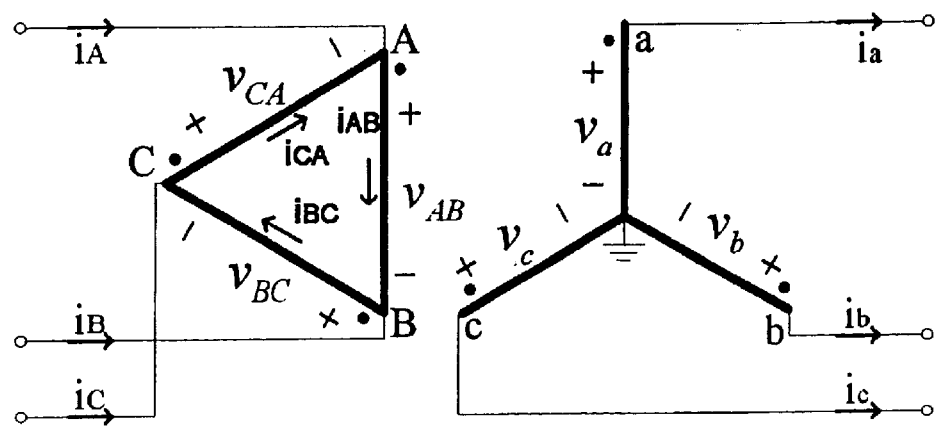
FIG. 17 shows the drawing of a two winding three-phase Δ-Y transformer.

FIG. 17 shows a two-winding three-phase Δ-Y transformer. Voltages of the primary windings can be represented by the following Equations.

$$v_{AB} = R_{AB} i_{AB} + L_{lAB} \frac{d i_{AB}}{dt} + e_{AB} \quad \text{[Equation 30]}$$

$$v_{BC} = R_{BC} i_{BC} + L_{lBC} \frac{d i_{BC}}{dt} + e_{BC} \quad \text{[Equation 31]}$$

$$v_{CA} = R_{CA} i_{CA} + L_{lCA} \frac{d i_{CA}}{dt} + e_{CA} \quad \text{[Equation 32]}$$

Also, voltages of the secondary windings can be represented by the following Equations.

$$v_a = -R_a i_a - L_{la} \frac{d i_a}{dt} + e_a \quad \text{[Equation 33]}$$

$$v_b = -R_b i_b - L_{lb} \frac{d i_b}{dt} + e_b \quad \text{[Equation 34]}$$

$$v_c = -R_c i_c - L_{lc} \frac{d i_c}{dt} + e_c \quad \text{[Equation 35]}$$

In a similar manner to a Y-Δ transformer, the relationships of $r_{AB} \approx r_{BC} \approx r_{CA} \approx r$, $L_{lAB} \approx L_{lBC} \approx L_{lCA} \approx L_l$, $i_{CA} - i_{AB} = -i_A$, $i_{AB} - i_{BC} = -i_B$, $i_{BC} - i_{CA} = -i_C$ are used. From the above Equations, the differences of induced voltages of the primary windings can be obtained as follows:

$$e_{CA} - e_{AB} = v_{CA} - v_{AB} + Ri_A + L_l \frac{di_A}{dt} \quad \text{[Equation 36]}$$

$$e_{AB} - e_{BC} = v_{AB} - v_{BC} + Ri_B + L_l \frac{di_B}{dt} \quad \text{[Equation 37]}$$

$$e_{BC} - e_{CA} = v_{BC} - v_{CA} + Ri_C + L_l \frac{di_C}{dt} \quad \text{[Equation 38]}$$

Also, the differences of induced voltages of the secondary windings can be given by the following Equations.

$$e_c - e_a = v_c - v_a + (R_c i_c - R_a i_a) + \left( L_{lc} \frac{di_c}{dt} - L_{la} \frac{di_a}{dt} \right) \quad \text{[Equation 39]}$$

$$e_a - e_b = v_a - v_b + (R_a i_a - R_b i_b) + \left( L_{la} \frac{di_a}{dt} - L_{lb} \frac{di_b}{dt} \right) \quad \text{[Equation 40]}$$

$$e_b - e_c = v_b - v_c + (R_b i_b - R_c i_c) + \left( L_{lb} \frac{di_b}{dt} - L_{lc} \frac{di_c}{dt} \right) \quad \text{[Equation 41]}$$

Like a Y-Δ transformer, Equation 42 is a necessary and sufficient condition of Equation 43. From the above fact, the three Detectors of Equation 44, Equation 45, and Equation 46 can be used as the predetermined decision parameter.

$$\frac{e_{CA}}{e_c} = \frac{N_1}{N_2}, \frac{e_{AB}}{e_a} = \frac{N_1}{N_2}, \frac{e_{BC}}{e_b} = \frac{N_1}{N_2} \quad \text{[Equation 42]}$$

$$\frac{e_{CA} - e_{AB}}{e_c - e_a} = \frac{N_1}{N_2}, \frac{e_{AB} - e_{BC}}{e_a - e_b} = \frac{N_1}{N_2}, \frac{e_{BC} - e_{CA}}{e_b - e_c} = \frac{N_1}{N_2} \quad \text{[Equation 43]}$$

$$\text{Detector 1} = \frac{e_{CA} - e_{AB} - \frac{N_1}{N_2}(e_c - e_a)}{V_{CArms}} \times 100 \ (\%) \quad \text{[Equation 44]}$$

$$\text{Detector 2} = \frac{e_{AB} - e_{BC} - \frac{N_1}{N_2}(e_a - e_b)}{V_{ABrms}} \times 100 \ (\%) \quad \text{[Equation 45]}$$

$$\text{Detector 3} = \frac{e_{BC} - e_{CA} - \frac{N_1}{N_2}(e_b - e_c)}{V_{BCrms}} \times 100 \ (\%) \quad \text{[Equation 46]}$$

Figure 16:
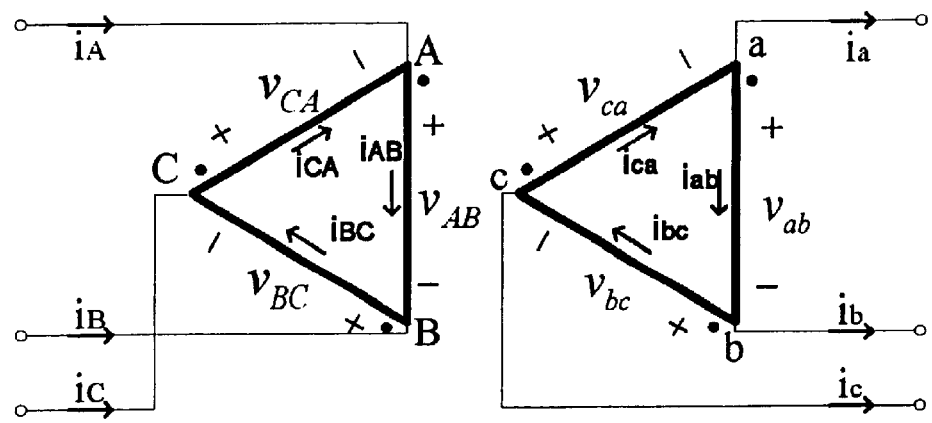
FIG. 16 shows the drawing of a two winding three-phase Δ-Δ transformer.

FIG. 16 shows a two-winding three-phase Δ-Δ transformer. Voltages of the primary windings can be represented by the following Equations.

$$v_{AB} = r_{AB} i_{AB} + L_{lAB} \frac{di_{AB}}{dt} + e_{AB} \quad \text{[Equation 47]}$$

$$v_{BC} = r_{BC} i_{BC} + L_{lBC} \frac{di_{BC}}{dt} + e_{BC} \quad \text{[Equation 48]}$$

$$v_{CA} = r_{CA} i_{CA} + L_{lCA} \frac{di_{CA}}{dt} + e_{CA} \quad \text{[Equation 49]}$$

Also, voltages of the secondary windings can be represented by the following Equations.

$$v_{ab} = r_{ab} i_{ab} + L_{lab} \frac{di_{ab}}{dt} + e_{ab} \quad \text{[Equation 50]}$$

$$v_{bc} = r_{bc} i_{bc} + L_{lbc} \frac{di_{bc}}{dt} + e_{bc} \quad \text{[Equation 51]}$$

$$v_{ca} = r_{ca} i_{ca} + L_{lca} \frac{di_{ca}}{dt} + e_{ca} \quad \text{[Equation 52]}$$

In a similar manner to a Δ-Y transformer, the relationships of $r_{AB} \approx r_{BC} \approx r_{CA} \approx r_1$, $L_{lAB} \approx L_{lBC} \approx L_{lCA} \approx L_{l1}$, $i_{CA} - i_{AB} = -i_A$, $i_{AB} - i_{BC} = -i_B$, $i_{BC} - i_{CA} = -i_C$, $r_{ab} \approx r_{bc} \approx r_{ca} \approx r_2$, $L_{lab} \approx L_{lbc} \approx L_{l2}$, $i_{ca} - i_{ab} = i_a$, $i_{ab} - i_{bc} = i_b$, $i_{bc} - i_{ca} = i_c$ are used. From the above Equations, the differences of induced voltages of the primary windings can be obtained as follows:

$$e_{CA} - e_{AB} = v_{CA} - v_{AB} + r_1 i_A + L_{l1} \frac{di_A}{dt} \quad \text{[Equation 53]}$$

$$e_{AB} - e_{BC} = v_{AB} - v_{BC} + r_1 i_B + L_{l1} \frac{di_B}{dt} \quad \text{[Equation 54]}$$

$$e_{BC} - e_{CA} = v_{BC} - v_{CA} + r_1 i_C + L_{l1} \frac{di_C}{dt} \quad \text{[Equation 55]}$$

Also, the differences of induced voltages of the secondary windings can be given by the following Equations.

$$e_{ca} - e_{ab} = v_{ca} - v_{ab} - r_2 i_a - L_{l2} \frac{di_a}{dt} \quad \text{[Equation 56]}$$

$$e_{ab} - e_{bc} = v_{ab} - v_{bc} - r_2 i_b - L_{l2} \frac{di_b}{dt} \quad \text{[Equation 57]}$$

$$e_{bc} - e_{ca} = v_{bc} - v_{ca} - r_2 i_c - L_{l2} \frac{di_c}{dt} \quad \text{[Equation 58]}$$

Like Y-Δ and Δ-Y transformers, Equation 59 is a necessary and sufficient condition of Equation 60. From the above fact, the three Detectors of Equation 61, Equation 62, and Equation 63 can be used as the predetermined decision parameter.

$$\frac{e_{CA}}{e_{ca}} = \frac{N_1}{N_2}, \frac{e_{AB}}{e_{ab}} = \frac{N_1}{N_2}, \frac{e_{BC}}{e_{bc}} = \frac{N_1}{N_2} \quad \text{[Equation 59]}$$

$$\frac{e_{CA} - e_{AB}}{e_{ca} - e_{ab}} = \frac{N_1}{N_2}, \frac{e_{AB} - e_{BC}}{e_{ab} - e_{bc}} = \frac{N_1}{N_2}, \frac{e_{BC} - e_{CA}}{e_{bc} - e_{ca}} = \frac{N_1}{N_2} \quad \text{[Equation 60]}$$

$$\text{Detector 1} = \frac{e_{CA} - e_{AB} - \frac{N_1}{N_2}(e_{ca} - e_{ab})}{V_{CArms}} \times 100 \ (\%) \quad \text{[Equation 61]}$$

$$\text{Detector 2} = \frac{e_{AB} - e_{BC} - \frac{N_1}{N_2}(e_{ab} - e_{bc})}{V_{ABrms}} \times 100 \ (\%) \quad \text{[Equation 62]}$$

$$\text{Detector 3} = \frac{e_{BC} - e_{CA} - \frac{N_1}{N_2}(e_{bc} - e_{ca})}{V_{BCrms}} \times 100 \ (\%) \quad \text{[Equation 63]}$$

The second preferred embodiment of the invention is about a protective relaying algorithm for power transformers using the ratio of flux linkage increments of primary and secondary windings. If there is no internal fault of the two-winding single-phase transformer, the primary and secondary voltages at any instant can be given by the following Equation 64 and Equation 65.

$$v_1 = R_1 i_1 + L_{l1} \frac{di_1}{dt} + \frac{d\lambda_1}{dt} \quad \text{[Equation 64]}$$

$$v_2 = -R_2 i_2 - L_{l2} \frac{di_2}{dt} + \frac{d\lambda_2}{dt} \quad \text{[Equation 65]}$$

where, $R_1$, $R_2$ are the primary and secondary winding resistances, respectively, and $L_{l1}$, $L_{l2}$ are the primary and secondary leakage inductances, respectively, and $\lambda_1$, $\lambda_2$ are primary, secondary flux linkages, respectively.

Rearranging Equation 64 and Equation 65 yields Equation 66 and Equation 67.

$$\frac{d\lambda_1}{dt} = v_1 - R_1 i_1 - L_{l1}\frac{di_1}{dt} \qquad \text{[Equation 66]}$$

$$\frac{d\lambda_2}{dt} = v_2 + R_2 i_2 + L_{l2}\frac{di_2}{dt} \qquad \text{[Equation 67]}$$

Integrating both sides of Equation 66 and Equation 67 from $t_n$ to $t_{n-1}$ gives the following Equation 68 and Equation 69.

$$\Delta\lambda_1 = \lambda_1(t_n) - \lambda_1(t_{n-1}) = \qquad \text{[Equation 68]}$$
$$\int_{t_{n-1}}^{t_n} v_1 \, dt - R_1 \int_{t_{n-1}}^{t_n} i_1 \, dt - L_{l1}(i_1(t_n) - i_1(t_{n-1}))$$

$$\Delta\lambda_2 = \lambda_2(t_n) - \lambda_2(t_{n-1}) = \qquad \text{[Equation 69]}$$
$$\int_{t_{n-1}}^{t_n} v_2 \, dt + R_2 \int_{t_{n-1}}^{t_n} i_2 \, dt - L_{l2}(i_2(t_n) - i_2(t_{n-1}))$$

Thus, the increments of the flux linkage of the primary and secondary windings $\Delta\lambda_1$, $\Delta\lambda_2$ can be estimated with voltages, currents, winding resistances and leakage inductances. The ratio of Equation 68 to Equation 69 is defined by the ratio of flux linkage increments (RFLI) represented by Equation 70.

$$RFLI = \frac{\Delta\lambda_1}{\Delta\lambda_2} \qquad \text{[Equation 70]}$$

As $\Delta\lambda_1$, $\Delta\lambda_2$ can be estimated using Equation 68 and Equation 69 the RFLI can be calculated at any instant using Equation 5. In the steady state, if there is no internal winding fault, the RFLI at any instant is equal to the turn ratio, i.e. $N_1/N_2$ except for $\Delta\lambda_1=0$ or $\Delta\lambda_2=0$.

In case of magnetic inrush, as the core repeats saturation and unsaturation, a magnetizing current also repeats large and small. This phenomenon lasts for some time. However, in this case, since it is not an internal winding fault, the RFLI is also equal to the turn ratio even when $\Delta\lambda_1$, and $\Delta\lambda_2$ are not sinusoidal and distorted.

On the other hand, the RFLI is not the same as the turn ratio in case of internal winding faults. Thus, from this point, the second preferred embodiment of this invention detects an internal fault of a transformer based on the following fact; it is not an internal fault if the RFLI is the same as the turn ratio, while otherwise an internal fault.

However, $\Delta\lambda_1$ and $\Delta\lambda_2$ are instantaneous values and the RFLI can grow up to a large value when $\Delta\lambda_1$ has values near zero. In the second preferred embodiment of this invention, a Detector of Equation 71 is used to detect a fault instead of Equation 70. That is, if Equation 71 is less than the threshold, it is normal; otherwise, it is an internal winding fault.

$$\text{Detector} = \frac{\Delta\lambda_1 - \frac{N_1}{N_2}\Delta\lambda_2}{\frac{V_{1rms}}{4.44f}\Delta T} \times 100 \, (\%) \qquad \text{[Equation 71]}$$

where, $V_{1rms}$ is the primary rated voltage and f is nominal frequency and $\Delta T = t_n - t_{n-1}$.

Now, the relaying method to a two-winding three-phase Y—Y transformer is applied. In FIG. 2, voltages of the primary windings can be represented as Equation 72, Equation 73, and Equation 74.

$$v_A = R_A i_A + L_{lA}\frac{di_A}{dt} + \frac{d\lambda_A}{dt} \qquad \text{[Equation 72]}$$

$$v_B = R_B i_B + L_{lB}\frac{di_B}{dt} + \frac{d\lambda_B}{dt} \qquad \text{[Equation 73]}$$

$$v_C = R_C i_C + L_{lC}\frac{di_C}{dt} + \frac{d\lambda_C}{dt} \qquad \text{[Equation 74]}$$

where, $R_A$, $R_B$, $R_C$ mean primary winding resistances and $L_{lA}$, $L_{lB}$, $L_{lC}$ mean primary leakage inductances, and $\lambda_A$, $\lambda_B$, $\lambda_C$ mean primary flux linkages.

And, the voltages of the secondary windings are given by Equation 75, Equation 76, and Equation 77.

$$v_a = -R_a i_a - L_{la}\frac{di_a}{dt} + \frac{d\lambda_a}{dt} \qquad \text{[Equation 75]}$$

$$v_b = -R_b i_b - L_{lb}\frac{di_b}{dt} + \frac{d\lambda_b}{dt} \qquad \text{[Equation 76]}$$

$$v_c = -R_c i_c - L_{lc}\frac{di_c}{dt} + \frac{d\lambda_c}{dt} \qquad \text{[Equation 77]}$$

where, $R_a$, $R_b$, $R_c$ are secondary winding resistances, and $L_{la}$, $L_{lb}$, $L_{lc}$ are secondary leakage inductances, and $\lambda_a$, $\lambda_b$, $\lambda_c$ are secondary flux linkages.

In case of a three-phase Y—Y transformer, in exactly the same manner of a single-phase transformer, three Detectors are defined by Equation 78, Equation 79, and Equation 80.

$$\text{Detector } A = \frac{\Delta\lambda_A - \frac{N_1}{N_2}\Delta\lambda_a}{\frac{V_{Arms}}{4.44f}\Delta T} \times 100 \, (\%) \qquad \text{[Equation 78]}$$

$$\text{Detector } B = \frac{\Delta\lambda_B - \frac{N_1}{N_2}\Delta\lambda_b}{\frac{V_{Brms}}{4.44f}\Delta T} \times 100 \, (\%) \qquad \text{[Equation 79]}$$

$$\text{Detector } C = \frac{\Delta\lambda_C - \frac{N_1}{N_2}\Delta\lambda_c}{\frac{V_{Crms}}{4.44f}\Delta T} \times 100 \, (\%) \qquad \text{[Equation 80]}$$

If values of Detector A, Detector B, and Detector C are larger than the threshold, it is determined that an internal fault occurred on phase A, phase B and phase C, respectively.

The next topic is about a two-winding three-phase Y-Δ transformer.

Voltages of the wye-connected windings (as shown in FIG. 3) are represented in Equation 72, Equation 73 and Equation 74. Equation 81, Equation 82 and Equation 83 represent voltages of delta-connected windings.

$$v_{ab} = R_{ab} i_{ab} + L_{lab}\frac{di_{ab}}{dt} + \frac{d\lambda_{ab}}{dt} \qquad \text{[Equation 81]}$$

$$v_{bc} = R_{bc} i_{bc} + L_{lbc}\frac{di_{bc}}{dt} + \frac{d\lambda_{bc}}{dt} \qquad \text{[Equation 82]}$$

$$v_{ca} = R_{ca}i_{ca} + L_{lca}\frac{di_{ca}}{dt} + \frac{d\lambda_{ca}}{dt} \quad \text{[Equation 83]}$$

where, $R_{ab}$, $R_{bc}$, $R_{ca}$ are secondary winding resistances, and $L_{lab}$, $L_{lbc}$, $L_{lca}$ are secondary leakage inductances, and $\lambda_{ab}$, $\lambda_{bc}$, $\lambda_{ca}$ are secondary flux linkages.

As $i_{ab}$, $i_{bc}$, $i_{ca}$ are not available in case of Y-Δ connection, $\lambda_{ab}$, $\lambda_{bc}$, $\lambda_{ca}$ cannot be calculated directly from Equation 81, Equation 82 and Equation 83. However, $i_a$, $i_b$, $i_c$ are available. Thus, in this invention, in order to use $i_a$, $i_b$, $i_c$ the following relations $i_{ca}-i_{ab}=i_a$, $i_{ab}-i_{bc}=i_b$, $i_{bc}-i_{ca}=i_c$ are employed. Moreover, if there is no internal winding fault, $R_{ab} \approx R_{bc} \approx R_{ca} = R$ and $L_{lab} \approx L_{lbc} \approx L_{lca} = L_l$. Therefore, manipulating Equation 81, Equation 82 and Equation 83 gives the following Equation 84, Equation 85 and Equation 86.

$$\frac{d\lambda_{ca}}{dt} - \frac{d\lambda_{ab}}{dt} = v_{ca} - v_{ab} - Ri_a - L_l\frac{di_a}{dt} \quad \text{[Equation 84]}$$

$$\frac{d\lambda_{ab}}{dt} - \frac{d\lambda_{bc}}{dt} = v_{ab} - v_{bc} - Ri_b - L_l\frac{di_b}{dt} \quad \text{[Equation 85]}$$

$$\frac{d\lambda_{bc}}{dt} - \frac{d\lambda_{ca}}{dt} = v_{bc} - v_{ca} - Ri_c - L_l\frac{di_c}{dt} \quad \text{[Equation 86]}$$

Therefore, left-hand sides of Equation 84, Equation 85 and Equation 86 can be calculated. The following Equation 87, Equation 88, and Equation 89 for the primary winding corresponding to Equation 84, Equation 85 and Equation 86 can be derived by manipulating Equation 72, Equation 73 and Equation 74.

$$\frac{d\lambda_C}{dt} - \frac{d\lambda_A}{dt} = \quad \text{[Equation 87]}$$
$$v_C - v_A - (R_C i_C - R_A i_A) - \left(L_{lC}\frac{di_C}{dt} - L_{lA}\frac{di_A}{dt}\right)$$

$$\frac{d\lambda_A}{dt} - \frac{d\lambda_B}{dt} = \quad \text{[Equation 88]}$$
$$v_A - v_B - (R_A i_A - R_B i_B) - \left(L_{lA}\frac{di_A}{dt} - L_{lB}\frac{di_B}{dt}\right)$$

$$\frac{d\lambda_B}{dt} - \frac{d\lambda_C}{dt} = \quad \text{[Equation 89]}$$
$$v_B - v_C - (R_B i_B - R_C i_C) - \left(L_{lB}\frac{di_B}{dt} - L_{lC}\frac{di_C}{dt}\right)$$

If there is no internal fault in case of a Y-Δ transformer, the following relationships in Equation 90 are valid.

$$\frac{\Delta\lambda_A}{\Delta\lambda_{ab}} = \frac{N_1}{N_2}, \frac{\Delta\lambda_B}{\Delta\lambda_{bc}} = \frac{N_1}{N_2}, \frac{\Delta\lambda_C}{\Delta\lambda_{ca}} = \frac{N_1}{N_2} \quad \text{[Equation 90]}$$

While $\Delta\lambda_A$, $\Delta\lambda_B$, $\Delta\lambda_C$ can be calculated, $\Delta\lambda_{ab}$, $\Delta\lambda_{bc}$, $\Delta\lambda_{ca}$ cannot. Thus, Equation 90 cannot be applied directly to Detectors (different from the case of a Y—Y transformer). Equation 91 is used for fault detection in case of a Y-Δ transformer.

$$\frac{\Delta(\lambda_C - \lambda_A)}{\Delta(e_{ca} - e_{ab})} = \frac{N_1}{N_2}, \frac{\Delta(\lambda_A - \lambda_B)}{\Delta(e_{ab} - e_{bc})} = \frac{N_1}{N_2}, \frac{\Delta(\lambda_B - \lambda_C)}{\Delta(e_{bc} - e_{ca})} = \frac{N_1}{N_2} \quad \text{[Equation 91]}$$

Equation 90 is a necessary and sufficient condition of Equation 91. Sufficient condition is proved trivially in substituting Equation 90 into Equation 91. Thus, only necessary condition will be proved. Let three RFLI as $\Delta\lambda_A/\Delta\lambda_{ab}=\alpha$, $\Delta\lambda_B/\Delta\lambda_{bc}=\beta$, and $\Delta\lambda_C/\Delta\lambda_{ca}=\gamma$. Substituting the three RFLIs into Equation 91 yields the following three equations $\Delta(\gamma\lambda_{ca}-\alpha\lambda_{ab})=(N_1/N_2)\Delta(\lambda_{ca}-\lambda_{ab})$, $\Delta(\alpha\lambda_{ab}-\beta\lambda_{bc})=(N_1/N_2)\Delta(\lambda_{ab}-\lambda_{bc})$, and $\Delta(\beta\lambda_{bc}-\gamma\lambda_{ca})=(N_1/N_2)\Delta(\lambda_{bc}-\lambda_{ca})$. In order for the former three Equations to be valid for all $\Delta\lambda_{ab}$, $\Delta\lambda_{bc}$, $\Delta\lambda_{ca}$ the condition of $\alpha=\beta=\gamma=N_1/N_2$ should be satisfied. Thus, $\Delta\lambda_A/\Delta\lambda_{ab}=\Delta\lambda_B/\Delta\lambda_{bc}=\Delta\lambda_C/\Delta\lambda_{ca}=N_1/N_2$. Therefore, Equation 90 is a necessary and sufficient condition of Equation 91.

Thus, in the second preferred embodiment of the invention, the Detectors for a Y-Δ transformer are given by Equation 92, Equation 93, and Equation 94.

$$\text{Detector 1} = \frac{\Delta(\lambda_C - \lambda_A) - \frac{N_1}{N_2}\Delta(\lambda_{ca} - \lambda_{ab})}{\frac{V_{CArms}}{4.44f}\Delta T} \times 100 \ (\%) \quad \text{[Equation 92]}$$

$$\text{Detector 2} = \frac{\Delta(\lambda_A - \lambda_B) - \frac{N_1}{N_2}\Delta(\lambda_{ab} - \lambda_{bc})}{\frac{V_{ABrms}}{4.44f}\Delta T} \times 100 \ (\%) \quad \text{[Equation 93]}$$

$$\text{Detector 3} = \frac{\Delta(\lambda_B - \lambda_C) - \frac{N_1}{N_2}\Delta(\lambda_{bc} - \lambda_{ca})}{\frac{V_{BCrms}}{4.44f}\Delta T} \times 100 \ (\%) \quad \text{[Equation 94]}$$

The rule of detecting internal faults and the faulted phase from the above three Detectors in case of a Y-Δ transformer is the same as Table 1 and its detailed explanation is omitted.

Case studies of the second preferred embodiment of a protective relaying method conducted on the model system of FIG. 4 is discussed.

The first case is magnetic inrush.

We will explain the two magnetic inrush cases of with 0(%) and +80(%) remanent fluxes of the saturation point in case of 0 (deg) energization angle and no load. FIG. 5 shows three-phase currents in case of magnetic inrush with a 0(%) remanent flux, 0 (deg) energization angle, and no load.

FIG. 11 shows calculated flux linkage difference's increments of Detector 1 i.e. $\Delta(\lambda_C-\lambda_A)$ and $(N_1/N_2)\Delta(\lambda_{ca}-\lambda_{ab})$, increments of Detector 2 i.e. $\Delta(\lambda_A-\lambda_B)$ and $(N_1/N_2)\Delta(\lambda_{ab}-\lambda_{bc})$, and increments of Detector 3 i.e. $\Delta(\lambda_B-\lambda_C)$ and $(N_1/N_2)\Delta(\lambda_{bc}-\lambda_{ca})$. The result indicates that the increments of the calculated flux linkage difference are nearly the same even if inrush currents contain harmonic components.

FIG. 12 shows three Detectors and a trip signal in case of no remanent flux according to the second preferred embodiment of this invention. The trip signal in FIG. 12 means the signal to initiate the circuit breaker after detection of a fault.

The fault detection rule is the same as that of the first case. As the three Detectors are less than 5(%), the trip signal is blocked even the A-phase inrush current increases up to nearly 900 (A) after the energization.

The errors shown in Detectors of FIG. 12 are small, similar to those of the first embodiment.

Figure 13A:
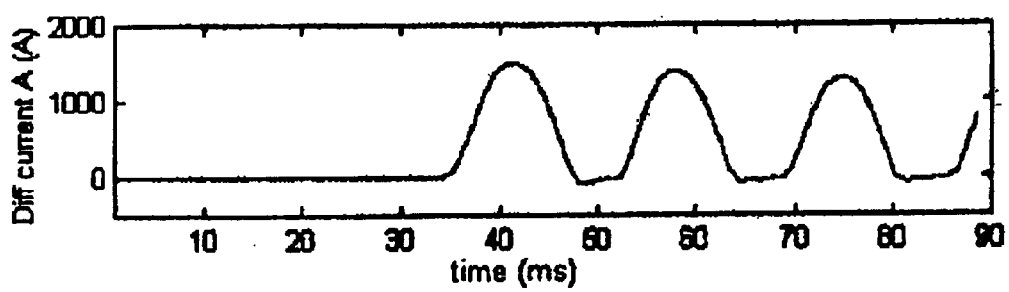
FIG. 13A to FIG. 13C show the drawings of currents of each phase in case of +80% remanent flux of the saturation point in the transformer according to preferred embodiment 2.
Figure 13B:
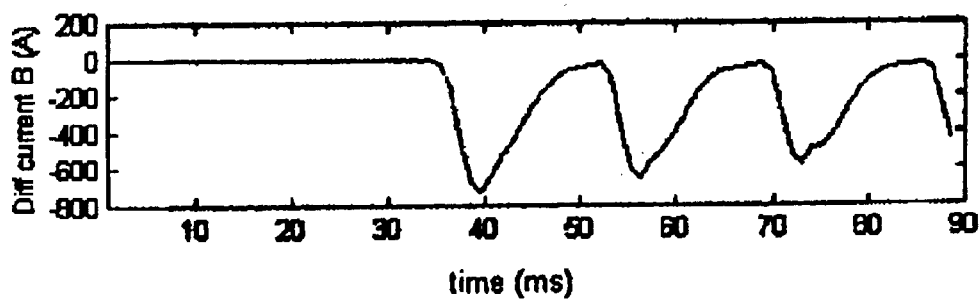
Figure 13C:
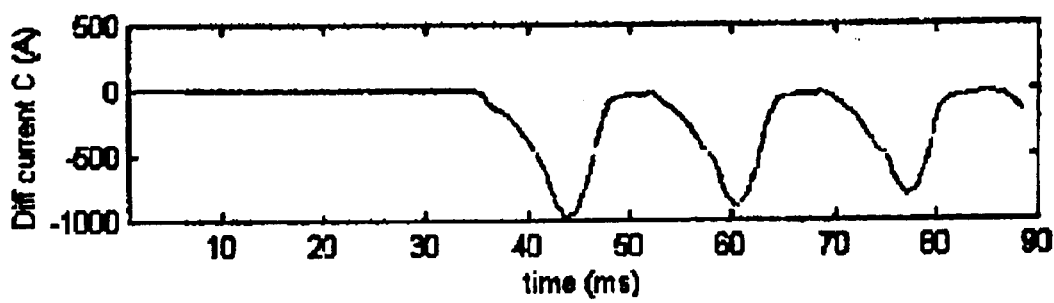
Figure 14A:
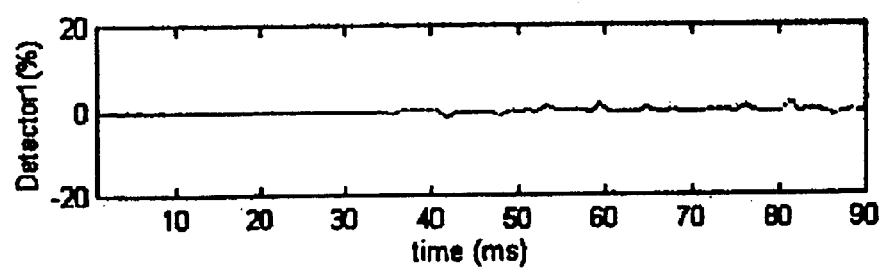
FIG. 14A to FIG. 14D show the drawings of three Detectors and a trip signal in case of +80% remanent flux according to the second preferred embodiment of this invention.
Figure 14B:
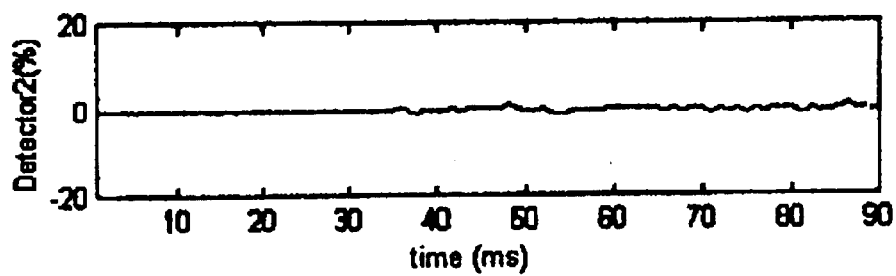
Figure 14C:
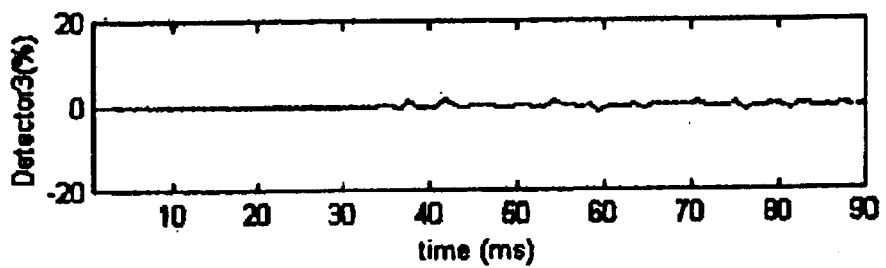
Figure 14D:
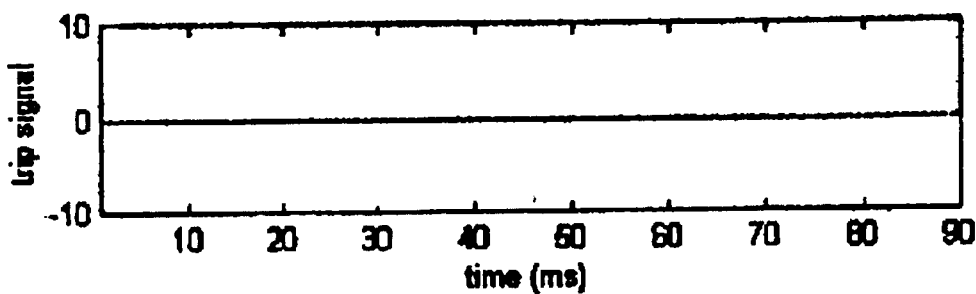
Figure 15A:
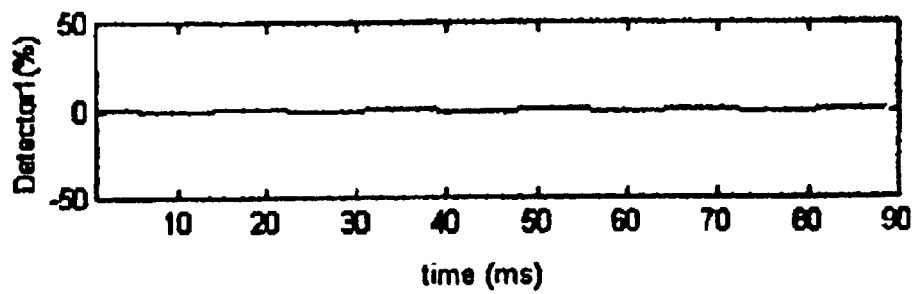
FIG. 15A to FIG. 15D show the drawings of three Detectors and a trip signal in case of the B-phase internal turn-to-earth fault at the 40% point from the neutral according to preferred embodiment 1 of this invention.
Figure 15B:
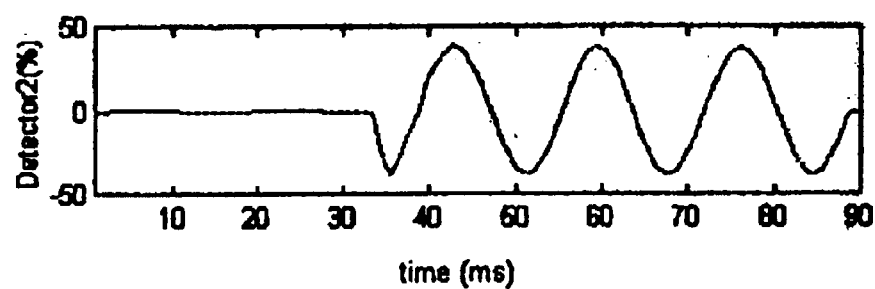
Figure 15C:
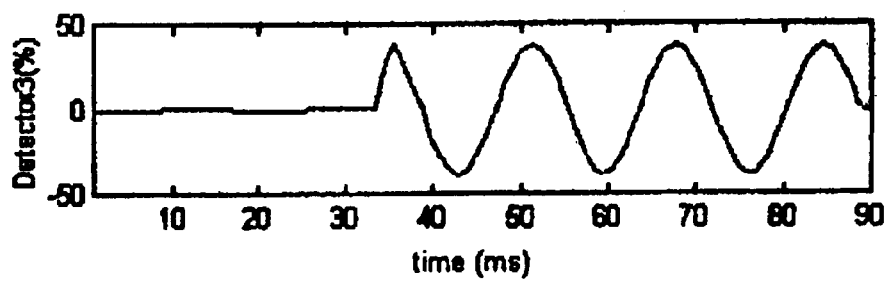
Figure 15D:
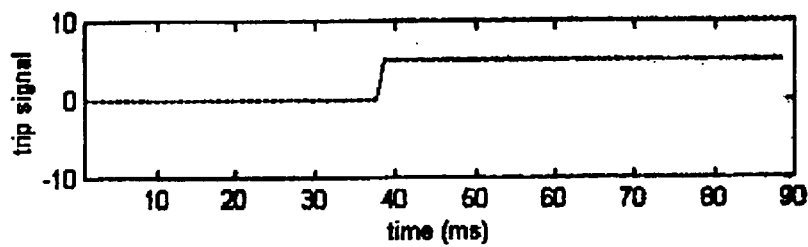

FIG. 13 and FIG. 14 show currents of each phase, the three Detectors, and a trip signal in case of +80% remanent flux of the saturation point in the transformer. Like the first preferred embodiment, all the three Detectors are less than 5(%) even in case of very large inrush currents and the trip signal is blocked.

Internal winding fault is now explained.

FIG. 15 shows the three Detectors and a trip signal in case of the B-phase internal turn-to-earth fault at the 40% point from the neutral according to the second preferred embodiment of this invention. Like the first embodiment, the proposed method detects the internal winding fault 4.167 (ms) after a fault. Finally, the second preferred embodiment proposes a transformer protective relaying algorithm using the ratio of flux linkage increments of the primary and secondary windings. The proposed algorithm calculates the flux linkage increments from the currents and voltages and then clearly discriminates between internal winding faults and magnetic inrush with the ratio. Various test results clearly demonstrate that the algorithm does not malfunction even in case of inrush with the maximum remanent flux. Moreover, it detects internal winding faults in only ¼ cycle after a fault.

Although the invention is described herein with reference to the preferred embodiment, it should be clearly understood that many variations and/or modifications of the basic inventive concepts herein taught which may be apparent to those skilled in the present art will remain within the spirit and scope of the present invention, as defined in the appended claims.

The cases of three-phase Δ-Y transformer and Δ-Δ transformer are briefly described below as examples of the above mentioned modifications.

FIG. 17 shows a two-winding three-phase Δ-Y transformer. Voltages of the primary windings can be represented by the following Equations.

$$v_{AB} = r_{AB}i_{AB} + L_{lAB}\frac{di_{AB}}{dt} + \frac{d\lambda_{AB}}{dt} \quad \text{[Equation 95]}$$

$$v_{BC} = r_{BC}i_{BC} + L_{lBC}\frac{di_{BC}}{dt} + \frac{d\lambda_{BC}}{dt} \quad \text{[Equation 96]}$$

$$v_{CA} = r_{CA}i_{CA} + L_{lCA}\frac{di_{CA}}{dt} + \frac{d\lambda_{cA}}{dt} \quad \text{[Equation 97]}$$

Also, voltages of the secondary windings can be represented by the following Equations.

$$v_a = -R_a i_a - L_{la}\frac{di_a}{dt} + \frac{d\lambda_a}{dt} \quad \text{[Equation 98]}$$

$$v_b = -R_b i_b - L_{lb}\frac{di_b}{dt} + \frac{d\lambda_b}{dt} \quad \text{[Equation 99]}$$

$$v_c = -R_c i_c - L_{lc}\frac{di_c}{dt} + \frac{d\lambda_c}{dt} \quad \text{[Equation 100]}$$

In a similar manner to a Y-Δ transformer, the relationships of $r_{AB} \approx r_{BC} \approx r_{CA} \approx r$, $L_{lAB} \approx L_{lBC} \approx L_{lCA} \approx L_l$, $i_{CA}-i_{AB}=-i_A$, $i_{AB}-i_{BC}=-i_B$, $i_{BC}-i_{CA}=-i_C$ are used. From the above Equations, flux tO linkage difference's increments the primary windings can be obtained as follows:

$$\frac{d\lambda_{CA}}{dt} - \frac{d\lambda_{AB}}{dt} = v_{CA} - v_{AB} + ri_A + L_l\frac{di_A}{dt} \quad \text{[Equation 101]}$$

$$\frac{d\lambda_{AB}}{dt} - \frac{d\lambda_{BC}}{dt} = v_{AB} - v_{BC} + ri_B + L_l\frac{di_B}{dt} \quad \text{[Equation 102]}$$

$$\frac{d\lambda_{BC}}{dt} - \frac{d\lambda_{CA}}{dt} = v_{BC} - v_{CA} + ri_C + L_l\frac{di_C}{dt} \quad \text{[Equation 103]}$$

Also, the differences of induced voltages of the secondary windings can be given by the following Equations.

$$\frac{d\lambda_c}{dt} - \frac{d\lambda_a}{dt} = v_c - v_a + (r_c i_c - r_a i_a) + \left(L_{lc}\frac{di_c}{dt} - L_{la}\frac{di_a}{dt}\right) \quad \text{[Equation 104]}$$

$$\frac{d\lambda_a}{dt} - \frac{d\lambda_b}{dt} = v_a - v_b + (r_a i_a - r_b i_b) + \left(L_{la}\frac{di_a}{dt} - L_{lb}\frac{di_b}{dt}\right) \quad \text{[Equation 105]}$$

$$\frac{d\lambda_b}{dt} - \frac{d\lambda_c}{dt} = v_b - v_c + (r_b i_b - r_c i_c) + \left(L_{lb}\frac{di_b}{dt} - L_{lc}\frac{di_c}{dt}\right) \quad \text{[Equation 106]}$$

Like a Y-Δ transformer, Equation 107 is a necessary and sufficient condition of Equation 108. From the above fact, the three Detectors of Equation 109, Equation 110, and Equation 111 can be used as the predetermined decision parameter.

$$\frac{\Delta\lambda_{CA}}{\Delta\lambda_c} = \frac{N_1}{N_2}, \frac{\Delta\lambda_{AB}}{\Delta\lambda_a} = \frac{N_1}{N_2}, \frac{\Delta\lambda_{BC}}{\Delta\lambda_b} = \frac{N_1}{N_2} \quad \text{[Equation 107]}$$

$$\frac{\Delta\lambda_{CA} - \Delta\lambda_{AB}}{\Delta\lambda_c - \Delta\lambda_a} = \frac{N_1}{N_2}, \quad \text{[Equation 108]}$$

$$\frac{\Delta\lambda_{AB} - \Delta\lambda_{BC}}{\Delta\lambda_a - \Delta\lambda_b} = \frac{N_1}{N_2}, \frac{\Delta\lambda_{BC} - \Delta\lambda_{CA}}{\Delta\lambda_b - \Delta\lambda_c} = \frac{N_1}{N_2}$$

$$\text{Detector 1} = \frac{\Delta(\lambda_{CA} - \lambda_{AB}) - \frac{N_1}{N_2}\Delta(\lambda_c - \lambda_a)}{\frac{V_{CArms}}{4.44f}\Delta T} \times 100(\%) \quad \text{[Equation 109]}$$

$$\text{Detector 2} = \frac{\Delta(\lambda_{AB} - \lambda_{BC}) - \frac{N_1}{N_2}\Delta(\lambda_a - \lambda_b)}{\frac{V_{ABrms}}{4.44f}\Delta T} \times 100(\%) \quad \text{[Equation 110]}$$

$$\text{Detector 3} = \frac{\Delta(\lambda_{BC} - \lambda_{CA}) - \frac{N_1}{N_2}\Delta(\lambda_b - \lambda_c)}{\frac{V_{BCrms}}{4.44f}\Delta T} \times 100(\%) \quad \text{[Equation 111]}$$

FIG. 16 shows a two-winding three-phase Δ-Δ transformer. Voltages of the primary windings can be represented by the following Equations.

$$v_{AB} = r_{AB}i_{AB} + L_{lAB}\frac{di_{AB}}{dt} + \frac{d\lambda_{AB}}{dt} \quad \text{[Equation 112]}$$

$$v_{BC} = r_{BC}i_{BC} + L_{lBC}\frac{di_{BC}}{dt} + \frac{d\lambda_{BC}}{dt} \quad \text{[Equation 113]}$$

$$v_{CA} = r_{CA}i_{CA} + L_{lCA}\frac{di_{CA}}{dt} + \frac{d\lambda_{CA}}{dt} \quad \text{[Equation 114]}$$

Also, voltages of the secondary windings can be represented by the following Equations.

$$v_{ab} = r_{ab}i_{ab} + L_{lab}\frac{di_{ab}}{dt} + \frac{d\lambda_{ab}}{dt} \quad \text{[Equation 115]}$$

$$v_{bc} = r_{bc}i_{bc} + L_{lbc}\frac{di_{bc}}{dt} + \frac{d\lambda_{bc}}{dt} \quad \text{[Equation 116]}$$

$$v_{ca} = r_{ca}i_{ca} + L_{lca}\frac{di_{ca}}{dt} + \frac{d\lambda_{ca}}{dt} \quad \text{[Equation 117]}$$

In a similar manner to a Δ-Y transformer, the relationships of $r_{AB} \approx r_{BC} \approx r_{CA} \approx r_1$, $L_{lAB} \approx L_{lBC} \approx L_{lCA} \approx L_{l1}$, $i_{CA}-i_{AB}=-i_A$, $i_{AB}-i_{BC}=-i_B$, $i_{BC}-i_{CA}=-i_C$, $r_{ab} \approx r_{bc} \approx r_{ca} \approx r_2$, $L_{lab} \approx L_{lbc} \approx L_{lca} \approx L_{l2}$, $i_{ca}-i_{ab}=i_a$, $i_{ab}-i_{bc}=i_b$, $i_{bc}-i_{ca}=i_c$ are used. From the above Equations, the flux linkage difference's increments of the primary windings can be obtained as follows:

$$\frac{d\lambda_{CA}}{dt} - \frac{d\lambda_{AB}}{dt} = v_{CA} - v_{AB} + r_1 i_A + L_{ll}\frac{di_A}{dt} \quad \text{[Equation 118]}$$

$$\frac{d\lambda_{AB}}{dt} - \frac{d\lambda_{BC}}{dt} = v_{AB} - v_{BC} + r_1 i_B + L_{ll}\frac{di_B}{dt} \quad \text{[Equation 119]}$$

$$\frac{d\lambda_{BC}}{dt} - \frac{d\lambda_{CA}}{dt} = v_{BC} - v_{CA} + r_1 i_C + L_{ll}\frac{di_C}{dt} \quad \text{[Equation 120]}$$

Also, the differences of induced voltages of the secondary windings can be given by the following Equations.

$$\frac{d\lambda_{ca}}{dt} - \frac{d\lambda_{ab}}{dt} = v_{ca} - v_{ab} - r_2 i_a - L_{l2}\frac{di_a}{dt} \quad \text{[Equation 121]}$$

$$\frac{d\lambda_{ab}}{dt} - \frac{d\lambda_{bc}}{dt} = v_{ab} - v_{bc} - r_2 i_b - L_{l2}\frac{di_b}{dt} \quad \text{[Equation 122]}$$

$$\frac{d\lambda_{bc}}{dt} - \frac{d\lambda_{ca}}{dt} = v_{bc} - v_{ca} - r_2 i_c - L_{l2}\frac{di_c}{dt} \quad \text{[Equation 123]}$$

Like Y-Δ and Δ-Y transformers, Equation 124 is a necessary and sufficient condition of Equation 125. From the above fact, the three Detectors of Equation 126, Equation 127, and Equation 128 can be used as the predetermined decision parameter.

$$\frac{\Delta\lambda_{CA}}{\Delta\lambda_{ca}} = \frac{N_1}{N_2}, \frac{\Delta\lambda_{AB}}{\Delta\lambda_{ab}} = \frac{N_1}{N_2}, \frac{\Delta\lambda_{BC}}{\Delta\lambda_{bc}} = \frac{N_1}{N_2} \quad \text{[Equation 124]}$$

$$\frac{\Delta\lambda_{CA} - \Delta\lambda_{AB}}{\Delta\lambda_{ca} - \Delta\lambda_{ab}} = \frac{N_1}{N_2}, \quad \text{[Equation 125]}$$

$$\frac{\Delta\lambda_{AB} - \Delta\lambda_{BC}}{\Delta\lambda_{ab} - \Delta\lambda_{bc}} = \frac{N_1}{N_2}, \frac{\Delta\lambda_{BC} - \Delta\lambda_{CA}}{\Delta\lambda_{bc} - \Delta\lambda_{ca}} = \frac{N_1}{N_2}$$

$$\text{Detector 1} = \frac{\Delta(\lambda_{CA} - \lambda_{AB}) - \frac{N_1}{N_2}\Delta(\lambda_{ca} - \lambda_{ab})}{\frac{V_{CArms}}{4.44f}\Delta T} \times 100(\%) \quad \text{[Equation 126]}$$

$$\text{Detector 2} = \frac{\Delta(\lambda_{AB} - \lambda_{BC}) - \frac{N_1}{N_2}\Delta(\lambda_{ab} - \lambda_{bc})}{\frac{V_{ABrms}}{4.44f}\Delta T} \times 100(\%) \quad \text{[Equation 127]}$$

$$\text{Detector 3} = \frac{\Delta(\lambda_{BC} - \lambda_{CA}) - \frac{N_1}{N_2}\Delta(\lambda_{bc} - \lambda_{ca})}{\frac{V_{BCrms}}{4.44f}\Delta T} \times 100(\%) \quad \text{[Equation 128]}$$

Although the invention is described herein with reference to the preferred embodiment, it should be clearly understood that many variations and/or modifications of the basic inventive concepts herein taught which may be apparent to those skilled in the present art will remain within the spirit and scope of the present invention, as defined in the appended claims.

The invention proposes a transformer protective relaying algorithm using the ratio of induced voltages or ratio of flux linkage increments. The ratios are the same as the turn ratio in case of magnetic inrush and overexcitation while they are not equal to the turn ratio in case of internal winding faults. Thus, The proposed algorithm calculates the induced voltages and flux linkage increments of the primary and secondary windings from the currents and voltages and then discriminates between internal winding faults and magnetic inrush with the ratio.

The proposed method does not require hysteresis data and can be applied without significant modification even if system and core conditions are significantly changed. In addition to that, as the algorithm works in time domain, it can reduce the relay's operating time, especially in a higher sampling rate.

What is claimed is:

1. A relaying method for protecting a transformer comprising the steps of:

obtaining primary and secondary and voltages and currents of said transformer;

calculating induced voltages, induced voltage differences, ratio of primary and secondary induced voltages, or ratio of primary and secondary induced voltage differences from said currents and said voltages;

calculating at least one predetermined decision parameter derived from at least one predetermined eguation;

deciding whether an internal winding fault occurs by comparing said decision parameter to said induced voltages, said induced voltage differences, said ratio of primary and secondary induced voltages, or said ratio of primary and secondary induced voltage differences;

wherein said transformer is a single-phase transformer; and wherein, in the step of calculating at least one predetermined decision parameter derived from at least one predetermined equation, said predetermined equation is $$\frac{e_1}{e_2} = \frac{N_1}{N_2}$$

or a modification of said equation ($e_1$, $e_2$: primary and secondary induced voltages; $N_1$, $N_2$: numbers of turns of primary and secondary windings).

2. The method of claim 1, wherein said decision parameter is:

$$\frac{e_1 - \frac{N_1}{N_2}e_2}{V_{1rms}} \times 100\% (V_{1rms}: \text{primary rated voltage}).$$

3. A relaying method for protecting a transformer comprising the steps of:

obtaining primary and secondary and voltages and currents of said transformer;

calculating induced voltages, induced voltage differences, ratio of primary and secondary induced voltages, or ratio of primary and secondary induced voltage differences from said currents and said voltages;

calculating at least one predetermined decision parameter derived from at least one predetermined equation;

deciding whether an internal winding fault occurs by comparing said decision parameter to said induced voltages, said induced voltage differences, said ratio of primary and secondary induced voltages, or said ratio of primary and secondary induced voltage differences;

wherein said transformer is a three-phase Y—Y transformer; and wherein, in the step of calculating at least one predetermined decision parameter derived from at least one predetermined equation, said predetermined equations are $$\frac{e_A}{e_a} = \frac{N_1}{N_2}, \quad \frac{e_B}{e_b} = \frac{N_1}{N_2}, \quad \frac{e_C}{e_c} = \frac{N_1}{N_2}$$

or modifications of said equations ($e_A$, $e_B$, $e_C$: primary induced voltages; $e_a$, $e_b$, $e_c$: secondary induced voltages; $N_1$, $N_2$: numbers of turns of primary and secondary windings).

4. The method of claim 3, wherein said decision parameters are:

$$\text{Detector } A = \frac{e_A - \frac{N_1}{N_2}e_a}{V_{Arms}} \times 100(\%)$$

$$\text{Detector } B = \frac{e_B - \frac{N_1}{N_2}e_b}{V_{Brms}} \times 100(\%)$$

$$\text{Detector } C = \frac{e_C - \frac{N_1}{N_2}e_c}{V_{Crms}} \times 100(\%)$$

($V_{Arms}$, $V_{Brms}$, $V_{Crms}$: primary rated voltages).

5. A relaying method for protecting a transformer comprising the steps of:

obtaining primary and secondary and voltages and currents of said transformer;

calculating induced voltages, induced voltage differences, ratio of primary and secondary induced voltages, or ratio of primary and secondary induced voltage differences from said currents and said voltages;

calculating at least one predetermined decision parameter derived from at least one predetermined equation;

deciding whether an internal winding fault occurs by comparing said decision parameter to said induced voltages, said induced voltage differences, said ratio of primary and secondary induced voltages, or said ratio of primary and secondary induced voltage differences;

wherein said transformer is a three-phase Y-Δ transformer; and wherein, in the step of calculating at least one predetermined decision parameter derived from at least one predetermined equation, said predetermined equations are $$\frac{e_A}{e_{ab}} = \frac{N_1}{N_2}, \quad \frac{e_B}{e_{bc}} = \frac{N_1}{N_2}, \quad \frac{e_C}{e_{ca}} = \frac{N_1}{N_2} \quad \text{or} \quad \frac{e_C - e_A}{e_{ca} - e_{ab}} = \frac{N_1}{N_2},$$

$$\frac{e_A - e_B}{e_{ab} - e_{bc}} = \frac{N_1}{N_2}, \quad \frac{e_B - e_C}{e_{bc} - e_{ca}} = \frac{N_1}{N_2}$$

or modifications of said equations ($e_A$, $e_B$, $e_C$: primary induced voltages; $e_{ab}$, $e_{bc}$, $e_{ca}$: secondary induced voltages; $N_1$, $N_2$: numbers of turns of primary and secondary windings).

6. The method of claim 5, wherein said decision parameters are:

$$\text{Detector } 1 = \frac{e_C - e_A - \frac{N_1}{N_2}(e_{ca} - e_{ab})}{V_{CArms}} \times 100(\%)$$

$$\text{Detector } 2 = \frac{e_A - e_B - \frac{N_1}{N_2}(e_{ab} - e_{bc})}{V_{ABrms}} \times 100(\%)$$

$$\text{Detector } 3 = \frac{e_B - e_C - \frac{N_1}{N_2}(e_{bc} - e_{ca})}{V_{BCrms}} \times 100(\%)$$

($V_{ABrms}$, $V_{BCrms}$, $V_{CArms}$: primary rated voltages).

7. A relaying method for protecting a transformer comprising the steps of:

obtaining primary and secondary and voltages and currents of said transformer;

calculating induced voltages, induced voltage differences, ratio of primary and secondary induced voltages, or ratio of primary and secondary induced voltage differences from said currents and said voltages;

calculating at least one predetermined decision parameter derived from at least one predetermined equation;

deciding whether an internal winding fault occurs by comparing said decision parameter to said induced voltages, said induced voltage differences, said ratio of primary and secondary induced voltages, or said ratio of primary and secondary induced voltage differences;

wherein said transformer is a three-phase Δ-Y transformer; and wherein, in the step of calculating at least one predetermined decision parameter derived from at least one predetermined equation, said predetermined equations are $$\frac{e_{CA}}{e_c} = \frac{N_1}{N_2}, \quad \frac{e_{AB}}{e_a} = \frac{N_1}{N_2}, \quad \frac{e_{BC}}{e_b} = \frac{N_1}{N_2} \quad \text{or} \quad \frac{e_{CA} - e_{AB}}{e_c - e_a} = \frac{N_1}{N_2},$$

$$\frac{e_{AB} - e_{BC}}{e_a - e_b} = \frac{N_1}{N_2}, \quad \frac{e_{BC} - e_{CA}}{e_b - e_c} = \frac{N_1}{N_2}$$

or modifications of said equations ($e_a$, $e_b$, $e_c$: secondary induced voltages; $e_{AB}$, $e_{BC}$, $e_{CA}$: primary induced voltages; $N_1$, $N_2$: numbers of turns of primary and secondary windings).

8. The method of claim 7, wherein said decision parameters are:

$$\text{Detector } 1 = \frac{e_{CA} - e_{AB} - \frac{N_1}{N_2}(e_c - e_a)}{V_{CArms}} \times 100(\%)$$

$$\text{Detector } 2 = \frac{e_{AB} - e_{BC} - \frac{N_1}{N_2}(e_a - e_b)}{V_{ABrms}} \times 100(\%)$$

$$\text{Detector } 3 = \frac{e_{BC} - e_{CA} - \frac{N_1}{N_2}(e_b - e_c)}{V_{BCrms}} \times 100(\%)$$

($V_{ABrms}$, $V_{BCrms}$, $V_{CArms}$: primary rated voltages).

9. A relaying method for protecting a transformer comprising the steps of:

obtaining primary and secondary and voltages and currents of said transformer;

calculating induced voltages, induced voltage differences, ratio of primary and secondary induced voltages, or ratio of primary and secondary induced voltage differences from said currents and said voltages;

calculating at least one predetermined decision parameter derived from at least one predetermined equation;

deciding whether an internal winding fault occurs by comparing said decision parameter to said induced voltages, said induced voltage differences, said ratio of primary and secondary induced voltages, or said ratio of primary and secondary induced voltage differences;

wherein said transformer is a three-phase Δ-Δ transformer; and wherein, in the step of calculating at least one predetermined decision parameter derived from at least one predetermined equation, said predetermined equations are $$\frac{e_{CA}}{e_{ca}} = \frac{N_1}{N_2}, \quad \frac{e_{AB}}{e_{ab}} = \frac{N_1}{N_2}, \quad \frac{e_{BC}}{e_{bc}} = \frac{N_1}{N_2} \quad \text{or} \quad \frac{e_{CA} - e_{AB}}{e_{ca} - e_{ab}} = \frac{N_1}{N_2},$$

$$\frac{e_{AB} - e_{BC}}{e_{ab} - e_{bc}} = \frac{N_1}{N_2}, \quad \frac{e_{BC} - e_{CA}}{e_{bc} - e_{ca}} = \frac{N_1}{N_2}$$

or modifications of said equations ($e_{ab}$, $e_{bc}$, $e_{ca}$: secondary induced voltages; $e_{AB}$, $e_{BC}$, $e_{CA}$: primary induced voltages; $N_1$, $N_2$: numbers of turns of primary and secondary windings).

10. The method of claim 9, wherein said decision parameters are:

$$\text{Detector 1} = \frac{e_{CA} - e_{AB} - \frac{N_1}{N_2}(e_{ca} - e_{ab})}{V_{CArms}} \times 100(\%)$$

$$\text{Detector 2} = \frac{e_{AB} - e_{BC} - \frac{N_1}{N_2}(e_{ab} - e_{bc})}{V_{ABrms}} \times 100(\%)$$

$$\text{Detector 3} = \frac{e_{BC} - e_{CA} - \frac{N_1}{N_2}(e_{bc} - e_{ca})}{V_{BCrms}} \times 100(\%)$$

($V_{ABrms}$, $V_{BCrms}$, $V_{CArms}$: primary rated voltages).

11. A relaying method for protecting a transformer comprising the steps of:

obtaining primary and secondary and voltages and currents of said transformer;

calculating flux linkage increments, flux linkage difference increments, the ratio of flux linkage increments of the primary and secondary windings, or the ratio of flux linkage difference increments of the primary and secondary windings from said currents and said voltages;

calculating at least one predetermined decision parameter derived from at least one predetermined equation;

deciding whether an internal winding fault occurs by comparing said decision parameter to said flux linkage increments, said flux linkage difference increments, said ratio of flux linkage increments of the primary and secondary windings, or said ratio of flux linkage difference increments of the primary and secondary windings;

wherein said transformer is a single-phase transformer; and wherein, in the step of calculating at least one predetermined decision parameter derived from at least one predetermined equation, said predetermined equation is $$\frac{\Delta\lambda_1}{\Delta\lambda_2} = \frac{N_1}{N_2}$$

or a modification of said equation ($\Delta\lambda_1$, $\Delta\lambda_2$: flux linkage increments of primary and secondary windings; $N_1$, $N_2$: numbers of turns of primary and secondary windings).

12. The method of claim 11, wherein said decision parameter is:

$$\text{Detector} = \frac{\Delta\lambda_1 - \frac{N_1}{N_2}\Delta\lambda_2}{\frac{V_{1rms}}{4.44f}\Delta T} \times 100(\%) \quad (V_{1rms}: \text{primary rated voltage}).$$

13. A relaying method for protecting a transformer comprising the steps of:

obtaining primary and secondary and voltages and currents of said transformer;

calculating flux linkage increments, flux linkage difference increments, the ratio of flux linkage increments of the primary and secondary windings, or the ratio of flux linkage difference increments of the primary and secondary windings from said currents and said voltages;

calculating at least one predetermined decision parameter derived from at least one predetermined equation;

deciding whether an internal winding fault occurs by comparing said decision parameter to said flux linkage increments, said flux linkage difference increments, said ratio of flux linkage increments of the primary and secondary windings, or said ratio of flux linkage difference increments of the primary and secondary windings;

wherein said transformer is a three-phase Y—Y transformer; and wherein, in the step of calculating at least one predetermined decision parameter derived from at least one predetermined equation, said predetermined equations are $$\frac{\Delta\lambda_A}{\Delta\lambda_a} = \frac{N_1}{N_2}, \quad \frac{\Delta\lambda_B}{\Delta\lambda_b} = \frac{N_1}{N_2}, \quad \frac{\Delta\lambda_C}{\Delta\lambda_c} = \frac{N_1}{N_2}$$

or modifications of said equations ($\Delta\lambda_A$, $\Delta\lambda_B$, $\Delta\lambda_C$: primary flux linkage increments; $\Delta\lambda_a$, $\Delta\lambda_b$, $\Delta\lambda_c$: secondary flux linkage increments; $N_1$, $N_2$: numbers of turns of primary and secondary windings).

14. The method of claim 13, wherein said decision parameters are:

$$\text{Detector } A = \frac{\Delta\lambda_A - \frac{N_1}{N_2}\Delta\lambda_a}{\frac{V_{Arms}}{4.44f}\Delta T} \times 100(\%)$$

$$\text{Detector } B = \frac{\Delta\lambda_B - \frac{N_1}{N_2}\Delta\lambda_b}{\frac{V_{Brms}}{4.44f}\Delta T} \times 100(\%)$$

$$\text{Detector } C = \frac{\Delta\lambda_C - \frac{N_1}{N_2}\Delta\lambda_c}{\frac{V_{Crms}}{4.44f}\Delta T} \times 100(\%)$$

($V_{Arms}$, $V_{Brms}$, $V_{Crms}$: primary rated voltages).

15. A relaying method for protecting a transformer comprising the steps of:

obtaining primary and secondary and voltages and currents of said transformer;

calculating flux linkage increments, flux linkage difference increments, the ratio of flux linkage increments of the primary and secondary windings, or the ratio of flux linkage difference increments of the primary and secondary windings from said currents and said voltages;

calculating at least one predetermined decision parameter derived from at least one predetermined equation;

deciding whether an internal winding fault occurs by comparing said decision parameter to said flux linkage increments, said flux linkage difference increments, said ratio of flux linkage increments of the primary and secondary windings, or said ratio of flux linkage difference increments of the primary and secondary windings;

wherein said transformer is a three-phase Y-Δ transformer; and wherein, in the step of calculating at least one predetermined decision parameter derived from at least one predetermined equation, said predetermined equations are $$\frac{\Delta\lambda_A}{\Delta\lambda_{ab}} = \frac{N_1}{N_2}, \quad \frac{\Delta\lambda_B}{\Delta\lambda_{bc}} = \frac{N_1}{N_2}, \quad \frac{\Delta\lambda_C}{\Delta\lambda_{ca}} = \frac{N_1}{N_2} \quad \text{or} \quad \frac{\Delta(\lambda_C - \lambda_A)}{\Delta(\lambda_{ca} - \lambda_{ab})} = \frac{N_1}{N_2},$$

$$\frac{\Delta(\lambda_A - \lambda_B)}{\Delta(\lambda_{ab} - \lambda_{bc})} = \frac{N_1}{N_2}, \quad \frac{\Delta(\lambda_B - \lambda_C)}{\Delta(\lambda_{bc} - \lambda_{ca})} = \frac{N_1}{N_2}$$

or modifications of said equations ($\Delta\lambda_A$, $\Delta\lambda_B$, $\Delta\lambda_C$: primary flux linkage increments; $\Delta\lambda_{ab}$, $\Delta\lambda_{bc}$, $\Delta\lambda_{ca}$: secondary flux linkage increments; $N_1$, $N_2$: numbers of turns of primary and secondary windings).

16. The method of claim 15, wherein said decision parameters are:

$$\text{Detector 1} = \frac{\Delta(\lambda_C - \lambda_A) - \frac{N_1}{N_2}\Delta(\lambda_{ca} - \lambda_{ab})}{\frac{V_{CArms}}{4.44f}\Delta T} \times 100(\%)$$

$$\text{Detector 2} = \frac{\Delta(\lambda_A - \lambda_B) - \frac{N_1}{N_2}\Delta(\lambda_{ab} - \lambda_{bc})}{\frac{V_{ABrms}}{4.44f}\Delta T} \times 100(\%)$$

$$\text{Detector 3} = \frac{\Delta(\lambda_B - \lambda_C) - \frac{N_1}{N_2}\Delta(\lambda_{bc} - \lambda_{ca})}{\frac{V_{BCrms}}{4.44f}\Delta T} \times 100(\%)$$

($V_{ABrms}$, $V_{BCrms}$, $V_{CArms}$: primary rated voltages).

17. A relaying method for protecting a transformer comprising the steps of:

obtaining primary and secondary and voltages and currents of said transformer;

calculating flux linkage increments, flux linkage difference increments, the ratio of flux linkage increments of the primary and secondary windings, or the ratio of flux linkage difference increments of the primary and secondary windings from said currents and said voltages;

calculating at least one predetermined decision parameter derived from at least one predetermined equation;

deciding whether an internal winding fault occurs by comparing said decision parameter to said flux linkage increments, said flux linkage difference increments, said ratio of flux linkage increments of the primary and secondary windings, or said ratio of flux linkage difference increments of the primary and secondary windings;

wherein said transformer is a three-phase Δ-Y transformer; and wherein, in the step of calculating at least one predetermined decision parameter derived from at least one predetermined equation, said predetermined equations are $$\frac{\Delta\lambda_{CA}}{\Delta\lambda_c} = \frac{N_1}{N_2}, \quad \frac{\Delta\lambda_{AB}}{\Delta\lambda_a} = \frac{N_1}{N_2}, \quad \frac{\Delta\lambda_{BC}}{\Delta\lambda_b} = \frac{N_1}{N_2} \quad \text{or} \quad \frac{\Delta\lambda_{CA} - \Delta\lambda_{AB}}{\Delta\lambda_c - \Delta\lambda_a} = \frac{N_1}{N_2},$$

$$\frac{\Delta\lambda_{AB} - \Delta\lambda_{BC}}{\Delta\lambda_a - \Delta\lambda_b} = \frac{N_1}{N_2}, \quad \frac{\Delta\lambda_{BC} - \Delta\lambda_{CA}}{\Delta\lambda_b - \Delta\lambda_c} = \frac{N_1}{N_2}$$

or modifications of equations ($\Delta\lambda_{AB}$, $\Delta\lambda_{BC}$, $\Delta\lambda_{CA}$: primary flux linkage increments; $\Delta\lambda_a$, $\Delta\lambda_b$, $\Delta\lambda_c$: secondary flux linkage increments; $N_1$, $N_2$: numbers of turns of primary and secondary windings).

18. The method of claim 17, wherein said decision parameters are:

$$\text{Detector 1} = \frac{\Delta(\lambda_{CA} - \lambda_{AB}) - \frac{N_1}{N_2}\Delta(\lambda_c - \lambda_a)}{\frac{V_{CArms}}{4.44f}\Delta T} \times 100(\%)$$

$$\text{Detector 2} = \frac{\Delta(\lambda_{AB} - \lambda_{BC}) - \frac{N_1}{N_2}\Delta(\lambda_a - \lambda_b)}{\frac{V_{ABrms}}{4.44f}\Delta T} \times 100(\%)$$

$$\text{Detector 3} = \frac{\Delta(\lambda_{BC} - \lambda_{CA}) - \frac{N_1}{N_2}\Delta(\lambda_b - \lambda_c)}{\frac{V_{BCrms}}{4.44f}\Delta T} \times 100(\%)$$

($V_{ABrms}$, $V_{BCrms}$, $V_{CArms}$: primary rated voltages).

19. A relaying method for protecting a transformer comprising the steps of:

obtaining primary and secondary and voltages and currents of said transformer;

calculating flux linkage increments, flux linkage difference increments, the ratio of flux linkage increments of the primary and secondary windings, or the ratio of flux linkage difference increments of the primary and secondary windings from said currents and said voltages;

calculating at least one predetermined decision parameter derived from at least one predetermined equation;

deciding whether an internal winding fault occurs by comparing said decision parameter to said flux linkage increments, said flux linkage difference increments, said ratio of flux linkage increments of the primary and secondary windings, or said ratio of flux linkage difference increments of the primary and secondary windings;

wherein said transformer is a three-phase Δ-Δ transformer; and wherein, in the step of calculating at least one predetermined decision parameter derived from at least one predetermined equation, said predetermined equations are $$\frac{\Delta\lambda_{CA}}{\Delta\lambda_{ca}} = \frac{N_1}{N_2}, \quad \frac{\Delta\lambda_{AB}}{\Delta\lambda_{ab}} = \frac{N_1}{N_2}, \quad \frac{\Delta\lambda_{BC}}{\Delta\lambda_{bc}} = \frac{N_1}{N_2} \quad \text{or} \quad \frac{\Delta\lambda_{CA} - \Delta\lambda_{AB}}{\Delta\lambda_{ca} - \Delta\lambda_{ab}} = \frac{N_1}{N_2},$$

-continued $$\frac{\Delta\lambda_{AB} - \Delta\lambda_{BC}}{\Delta\lambda_{ab} - \Delta\lambda_{bc}} = \frac{N_1}{N_2}, \quad \frac{\Delta\lambda_{BC} - \Delta\lambda_{CA}}{\Delta\lambda_{bc} - \Delta\lambda_{ca}} = \frac{N_1}{N_2}$$

or modifications of said equations ($\Delta\lambda_{AB}$, $\Delta\lambda_{BC}$, $\Delta\lambda_{CA}$: primary flux linkage increments; $\Delta\lambda_{ab}$, $\Delta\lambda_{bc}$, $\Delta\lambda_{ca}$: secondary flux linkage increments; $N_1$, $N_2$: numbers of turns of primary and secondary winding).

20. The method of claim 19, wherein said decision parameters are:

$$\text{Detector } 1 = \frac{\Delta(\lambda_{CA} - \lambda_{AB}) - \frac{N_1}{N_2}\Delta(\lambda_{ca} - \lambda_{ab})}{\frac{V_{CArms}}{4.44f}\Delta T} \times 100(\%)$$

$$\text{Detector } 2 = \frac{\Delta(\lambda_{AB} - \lambda_{BC}) - \frac{N_1}{N_2}\Delta(\lambda_{ab} - \lambda_{bc})}{\frac{V_{ABrms}}{4.44f}\Delta T} \times 100(\%)$$

$$\text{Detector } 3 = \frac{\Delta(\lambda_{BC} - \lambda_{CA}) - \frac{N_1}{N_2}\Delta(\lambda_{bc} - \lambda_{ca})}{\frac{V_{BCrms}}{4.44f}\Delta T} \times 100(\%)$$

($V_{ABrms}$, $V_{BCrms}$, $V_{CArms}$: primary rated voltages).

* * * * *